(12) United States Patent
Niedermeier et al.

(10) Patent No.: US 8,335,392 B2
(45) Date of Patent: Dec. 18, 2012

(54) METHOD FOR REDUCING IMAGE ARTIFACTS

(75) Inventors: Ulrich Niedermeier, Munich (DE); Peter Rieder, Munich (DE)

(73) Assignee: Entropic Communications, Inc., San Diego, CA (US)

(*) Notice: Subject to any disclaimer, the term of this patent is extended or adjusted under 35 U.S.C. 154(b) by 1039 days.

(21) Appl. No.: 12/228,248

(22) Filed: Aug. 11, 2008

(65) Prior Publication Data

US 2009/0060371 A1 Mar. 5, 2009

(30) Foreign Application Priority Data

Aug. 10, 2007 (DE) .......................... 10 2007 037 857

(51) Int. Cl.
*G06K 9/40* (2006.01)
(52) U.S. Cl. ........ 382/260; 348/447; 348/452; 348/607; 348/617; 348/618; 375/240.16; 375/240.29; 382/162; 382/240; 382/261; 382/275; 382/299; 702/19
(58) Field of Classification Search .................. None
See application file for complete search history.

(56) References Cited

U.S. PATENT DOCUMENTS

| | | | | |
|---|---|---|---|---|
| 4,573,070 A * | 2/1986 | Cooper | ........................... | 348/617 |
| 5,019,904 A * | 5/1991 | Campbell | ..................... | 348/447 |
| 5,294,998 A * | 3/1994 | Piovoso et al. | ............... | 382/261 |
| 5,504,531 A * | 4/1996 | Knee et al. | .................... | 348/452 |
| 6,408,104 B1 * | 6/2002 | Lim et al. | ...................... | 382/275 |
| 6,628,341 B1 * | 9/2003 | Staley et al. | .................. | 348/607 |
| 6,678,073 B1 * | 1/2004 | Jewitt | ............................ | 358/3.04 |
| 6,810,154 B2 * | 10/2004 | Konoshima | ................... | 382/299 |
| 6,898,321 B1 | 5/2005 | Knee et al. | | |
| 7,006,686 B2 * | 2/2006 | Hunter et al. | ................. | 382/162 |
| 7,031,392 B2 | 4/2006 | Kim et al. | | |
| 7,043,092 B1 | 5/2006 | Groliere | | |
| 2002/0181023 A1 * | 12/2002 | Gorian et al. | ................ | 358/3.04 |
| 2003/0053708 A1 * | 3/2003 | Kryukov et al. | ............. | 382/261 |
| 2003/0190086 A1 * | 10/2003 | Kim | ............................. | 382/275 |
| 2005/0031218 A1 * | 2/2005 | Berkner et al. | ............... | 382/240 |
| 2006/0015262 A1 * | 1/2006 | Gholap et al. | .................. | 702/19 |
| 2007/0064816 A1 * | 3/2007 | Chiang et al. | ............ | 375/240.29 |
| 2007/0071356 A1 | 3/2007 | Caviedes et al. | | |
| 2007/0229710 A1 * | 10/2007 | Park et al. | ..................... | 348/618 |
| 2008/0100748 A1 * | 5/2008 | Lei et al. | ....................... | 348/607 |
| 2009/0034622 A1 * | 2/2009 | Huchet et al. | ............ | 375/240.16 |

FOREIGN PATENT DOCUMENTS

WO   WO 2006/043190   4/2006

* cited by examiner

*Primary Examiner* — Tsung-Yin Tsai
(74) *Attorney, Agent, or Firm* — O'Shea Getz P.C.

(57) ABSTRACT

A method for reducing image artifacts in an image that includes a number of pixels each of which includes at least one video information value, includes generating a plurality of filter coefficients for at least some of the pixels of the image, on the basis of which the video information values of the pixels can be reconstructed. Artifact detection is performed to detect artifact regions within the image. At least some filter coefficients of those pixels that lie within the artifact regions are modified to generate modified filter coefficients. The video information values are synthesized using the filter coefficients, the modified filter coefficients being employed for the synthesis for pixels lying within the artifact regions.

17 Claims, 18 Drawing Sheets

| + | − |
|---|---|
| + | − |

| | | | | |
|---|---|---|---|---|
| | a1−b1<br>+a2−b2 | b1−c1<br>+b2−c2 | ... | |
| | a2−b2<br>+a3−b3 | b2−c2<br>+b3−c3 | ... | |
| | ... | ... | ... | |
| | | | | |

| + | + |
|---|---|
| − | − |

| | | | | |
|---|---|---|---|---|
| | a1+b1<br>−a2−b2 | b1+c1<br>−b2−c2 | ... | |
| | a2+b2<br>−a3−b3 | b2+c2<br>−b3−c3 | ... | |
| | ... | ... | ... | |
| | | | | |

| + | − |
|---|---|
| − | + |

| | | | | |
|---|---|---|---|---|
| | a1−b1−<br>a2+b2 | b1−c1−<br>b2+c2 | ... | |
| | a2−b2−<br>a3+b3 | b2−c2−<br>b3+c3 | ... | |
| | ... | ... | ... | |
| | | | | |

|   |   |   |   |
|---|---|---|---|
| + | + | − | − |
| + | + | − | − |
| + | + | − | − |
| + | + | − | − |

| a1+b1−c1−d1 +a2+b2−c2−d2 +a3+b3−c3−d3 +a4+b4−c4−d4 | ... | $HP^H_{4\times4}$ |
|---|---|---|
| ... | ... | |

FIG. 2D

|   |   |   |   |
|---|---|---|---|
| + | + | + | + |
| + | + | + | + |
| − | − | − | − |
| − | − | − | − |

| a1+b1+c1+d1 +a2+b2+c2+d2 −a3−b3−c3−d3 −a4−b4−c4−d4 | ... | $HP^V_{4\times4}$ |
|---|---|---|
| ... | ... | |

FIG. 2E

|   |   |   |   |
|---|---|---|---|
| + | + | − | − |
| + | + | − | − |
| − | − | + | + |
| − | − | + | + |

| a1+b1−c1−d1 +a2+b2−c2−d2− a3−b3+c3+d3− a4−b4+c4+d4 | ... | $HP^D_{4\times4}$ |
|---|---|---|
| ... | ... | |

| + | + | + | + | − | − | − | − |
|---|---|---|---|---|---|---|---|
| + | + | + | + | − | − | − | − |
| + | + | + | + | − | − | − | − |
| + | + | + | + | − | − | − | − |

$$a1+b1+c1+d1-e1-f1-g1-h1$$
$$+a2+b2+c2+d2-e2-f2-g2-h2$$
$$+a3+b3+c3+d3-e3-f3-g3-h3$$
$$+a4+b4+c4+d4-f4-e4-g4-h4$$

$HP^H_{4\times8}$

FIG 2H

| + | + | + | + | + | + | + | + |
|---|---|---|---|---|---|---|---|
| + | + | + | + | + | + | + | + |
| + | + | + | + | + | + | + | + |
| + | + | + | + | + | + | + | + |

$$a1+b1+c1+d1+e1+f1+g1+h1$$
$$+a2+b2+c2+d2+e2+f2+g2+h2$$
$$+a3+b3+c3+d3+e3+f3+g3+h3$$
$$+a4+b4+c4+d4+f4+e4+g4+h4$$

$LP_{4\times8}$

FIG 4A
$$LP^H_{4x4}(x,y) = \left[HP^H_{4x8}(x,y) - HP^H_{4x8}(x-4,y) + LP_{4x8}(x,y) + LP_{4x8}(x-4,y)\right]/4$$

FIG 4B
$$-HP^H_{2x4}(x,y) = \left[-HP^D_{4x4}(x,y) + HP^D_{4x4}(x,y-2) - HP^V_{4x4}(x,y) - HP^V_{4x4}(x,y-2)\right]/4$$

FIG 4C
$$LP^V_{2x4}(x,y) = \left[HP^V_{4x4}(x,y) - HP^V_{4x4}(x,y-2) + LP_{4x4}(x,y) + LP_{4x4}(x,y-2)\right]/4$$

FIG 4D

$$LP_{2\times2}(x,y) = \left[ -HP^H_{2\times4}(x-2,y) + HP^H_{2\times4}(x,y) + LP_{2\times4}(x-2,y) + LP_{2\times4}(x,y) \right]/4$$

FIG 4E

$$LP_{1\times2}(x,y) = \left[ -HP^V_{2\times2}(x,y-1) + HP^V_{2\times2}(x,y) + LP_{2\times2}(x,y-1) + LP_{2\times2}(x,y) \right]/4$$

FIG 4F

$$-HP^H_{1\times2}(x,y) = \left[ HP^D_{2\times2}(x,y-1) - HP^D_{2\times2}(x,y) - HP^H_{2\times2}(x,y-1) - HP^H_{2\times2}(x,y) \right]/4$$

FIG 4G

$$P(x,y) = \left[ -HP^H_{1\times2}(x-1,y) + HP^H_{1\times2}(x,y) + LP_{1\times2}(x-1,y) + LP_{1\times2}(x,y) \right]/4$$

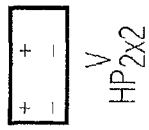
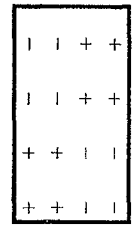
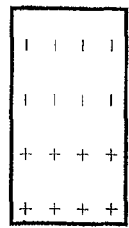
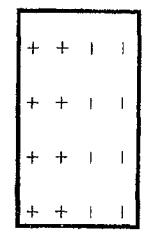
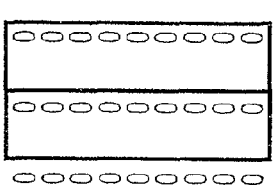
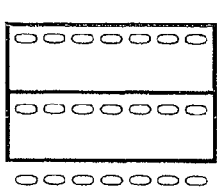
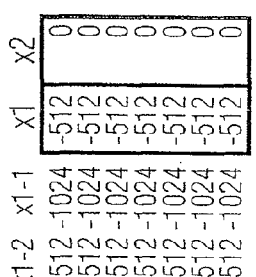
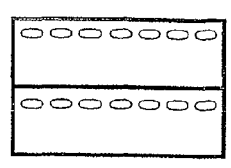
FIG 5D  FIG 5E  FIG 5F  FIG 5G

FIG 5H $HP^H_{4x8}$

|  | x1-6 | x1-5 | x1-4 | x1-3 | x1-2 | x1-1 | x1 |  |  |
|---|---|---|---|---|---|---|---|---|---|
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |
| 0 | -512 | -1024 | -1536 | -2048 | -1536 | -1024 | -512 | 0 | 0 |

FIG 5J $LP_{4x8}$

| 0 | 512 | 1024 | 1536 | 2048 | 2560 | 3072 | 3584 | 4096 | 4096 |
|---|---|---|---|---|---|---|---|---|---|
| 0 | 512 | 1024 | 1536 | 2048 | 2560 | 3072 | 3584 | 4096 | 4096 |
| 0 | 512 | 1024 | 1536 | 2048 | 2560 | 3072 | 3584 | 4096 | 4096 |
| 0 | 512 | 1024 | 1536 | 2048 | 2560 | 3072 | 3584 | 4096 | 4096 |
| 0 | 512 | 1024 | 1536 | 2048 | 2560 | 3072 | 3584 | 4096 | 4096 |
| 0 | 512 | 1024 | 1536 | 2048 | 2560 | 3072 | 3584 | 4096 | 4096 |
| 0 | 512 | 1024 | 1536 | 2048 | 2560 | 3072 | 3584 | 4096 | 4096 |
| 0 | 512 | 1024 | 1536 | 2048 | 2560 | 3072 | 3584 | 4096 | 4096 |

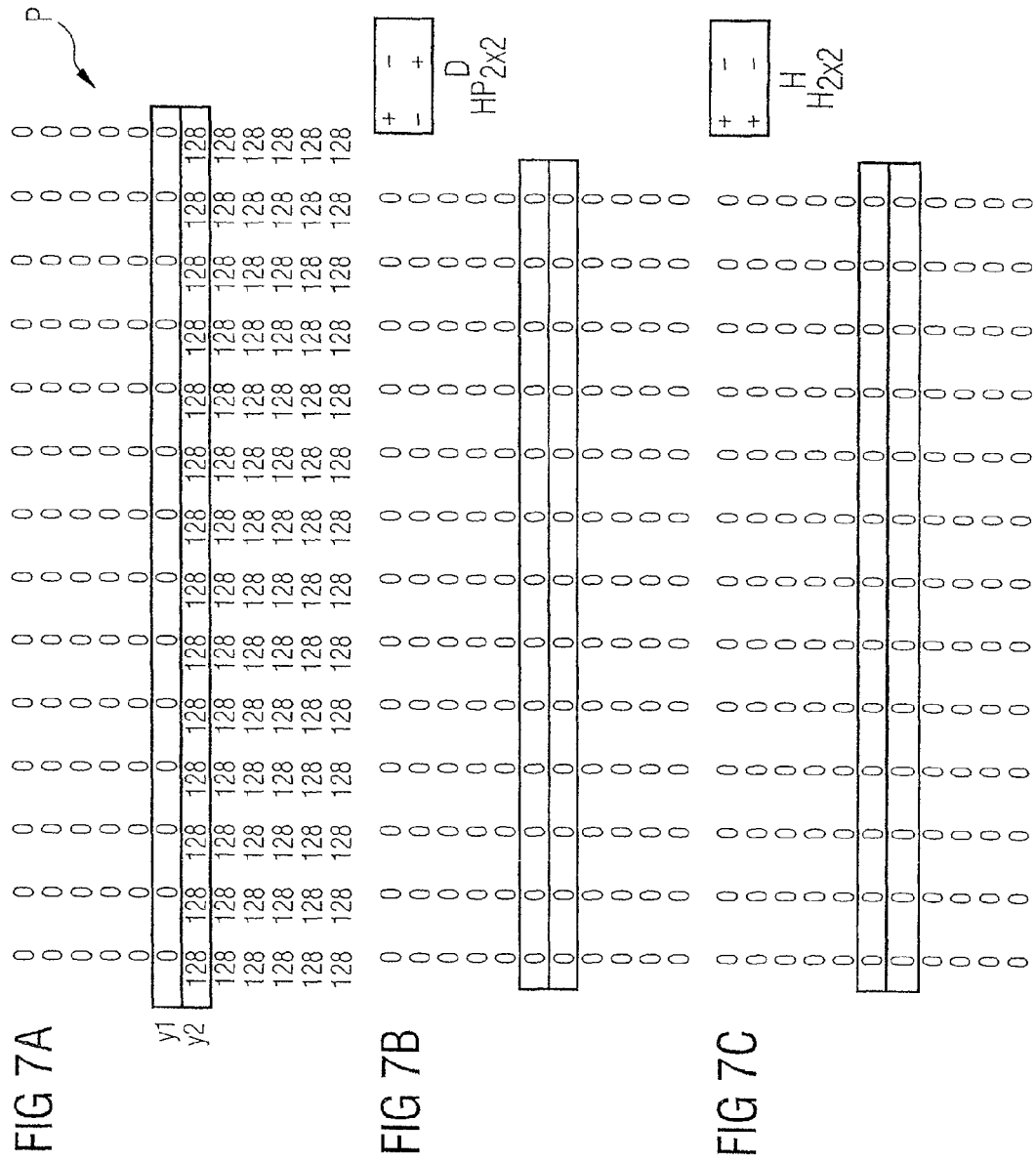

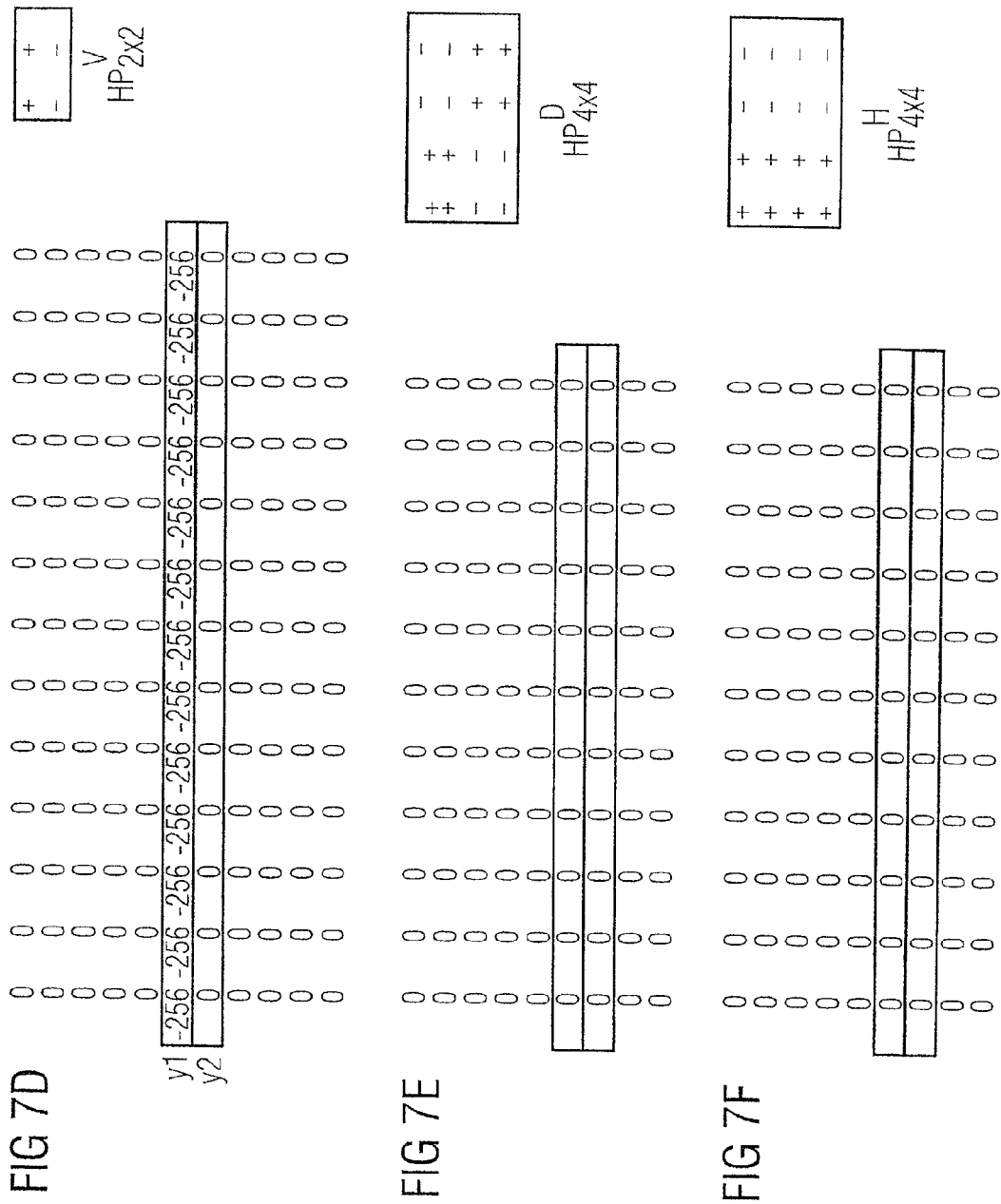

FIG 7G $V$
$HP_{4\times 4}$

| + | + | − | − |
|---|---|---|---|
| + | + | − | − |
| + | + | − | − |
| + | + | − | − | y1−2, y1−1, y1:

(rows of values including 0, −512, −1024 entries)

FIG 7H $H$
$HP_{4\times 8}$

| − | − | − | − |
|---|---|---|---|
| − | − | − | − |
| − | − | − | − |
| − | − | − | − |
| + | + | + | + |
| + | + | + | + |
| + | + | + | + |
| + | + | + | + |

FIG 7J $LP_{4\times 8}$

| + | + | + | + |
|---|---|---|---|
| + | + | + | + |
| + | + | + | + |
| + | + | + | + |
| + | + | + | + |
| + | + | + | + |
| + | + | + | + |
| + | + | + | + |

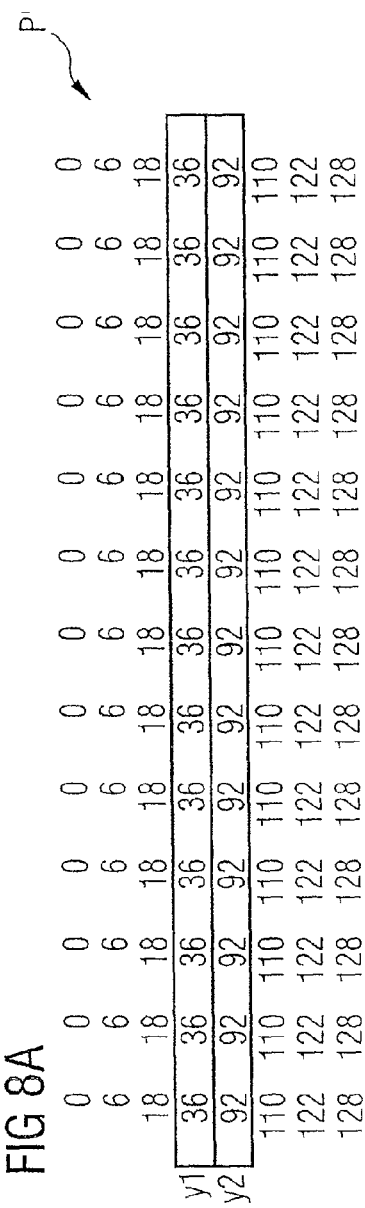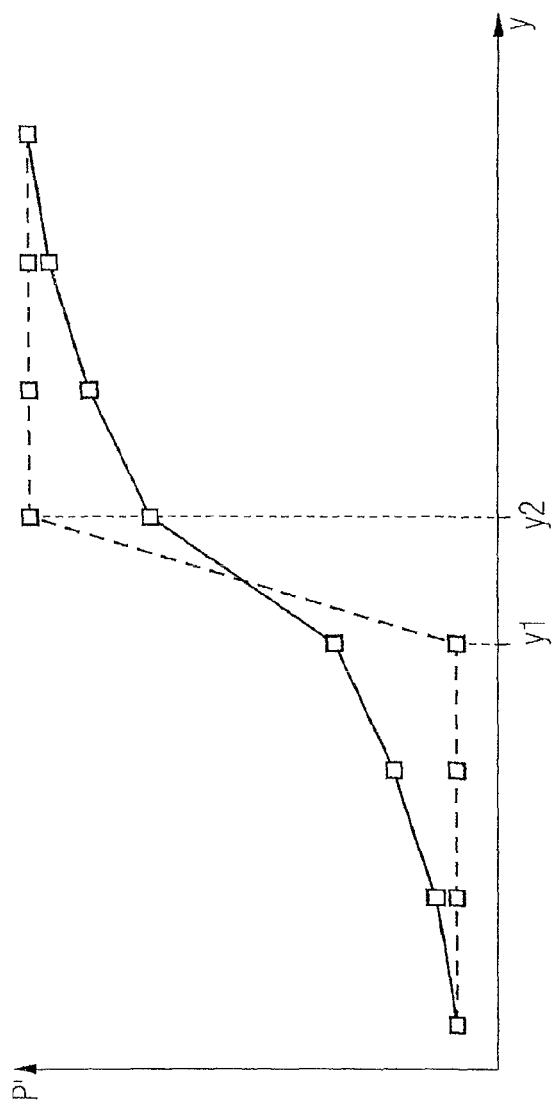

METHOD FOR REDUCING IMAGE ARTIFACTS

PRIORITY INFORMATION

This patent application claims priority from German Application No. 10 2007 037 857.4 filed Aug. 10, 2007, which is hereby incorporated by reference.

BACKGROUND OF THE INVENTION

The invention relates to the field of video image processing, and in particular to reducing image artifacts that result from block-based digital video compression.

In block-based video compression, including MPEG, consecutive images of an image sequence are divided into image blocks each having a plurality of pixels, for example 8×8 pixels, and the pixels of individual blocks are jointly encoded. In an image sequence reconstructed from the encoded data, a loss of video information arising through encoding may give rise to image artifacts, which may be salient depending on the image content.

An example of such artifacts is a blocking artifact, which arises when discontinuities in the run of the image occur at the boundaries of adjacent image blocks, that is, when for example discontinuous changes occur in the brightness (luminance) values associated with the individual pixels. The individual block boundaries are then visible within the image. A further example of image artifacts is a ringing artifact. This term denotes visible noise in the vicinity of sharp edges of an object represented by the image sequence.

There is a need for a system that reduces image artifacts.

SUMMARY OF THE INVENTION

According to an aspect of the invention, a method for reducing image artifacts in an image that includes a number of pixels each of which includes at least one video information value, includes generating a plurality of filter coefficients for at least some of the pixels of the image, on the basis of which the video information values of the pixels can be reconstructed. Artifact detection is performed to detect artifact regions within the image. At least some filter coefficients of those pixels that lie within the artifact regions are modified to generate modified filter coefficients. The video information values are synthesized using the filter coefficients, the modified filter coefficients being employed for the synthesis for pixels lying within the artifact regions.

These and other objects, features and advantages of the present invention will become more apparent in light of the following detailed description of preferred embodiments thereof, as illustrated in the accompanying drawings.

BRIEF DESCRIPTION OF THE DRAWINGS

FIGS. 2A-2H pictorially illustrate an effective technique, giving rise to little computational effort, for the frequency analysis of an image content, wherein a plurality of filter coefficients, where each filter coefficient represents a frequency component, is determined for individual pixels;

FIGS. 4A-4G pictorially illustrate the technique of FIG. 3;

FIGS. 5A-5H and 5J illustrate a vertical edge in the run of the image on the basis of video information values assigned to the individual pixels (FIG. 5A) and impacts of this edge in the run of the image on the individual filter coefficients (FIGS. 5B to 5J);

FIGS. 7A-7H and 7J illustrate a horizontal edge in the run of the image on the basis of video information values assigned to the individual pixels (FIG. 7A) and impacts of this edge in the run of the image on the individual filter coefficients (FIGS. 7B to 7J);

FIGS. 8A-8B illustrate the video information values obtained by synthesis of the filter coefficients, for the case where individual filter coefficients are modified before synthesis with the aim of flattening the run of the edge in the image;

DETAILED DESCRIPTION OF THE INVENTION

Figure 1:
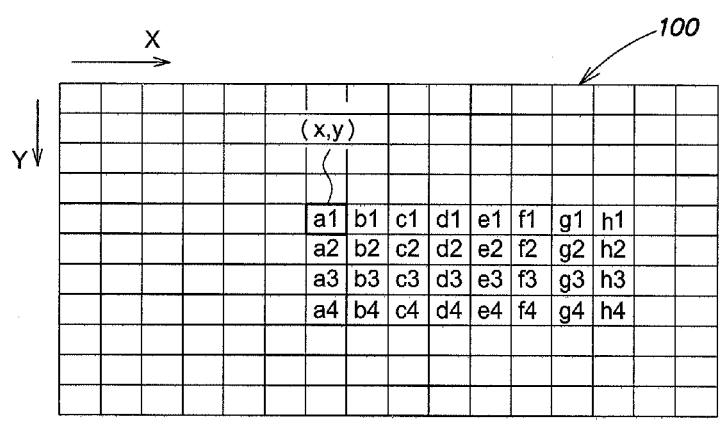
FIG. 1 depicts schematically an excerpt of an image that exhibits pixels arrayed in matrix fashion, where each pixel has an associated video information value.

In the Drawings, unless otherwise stated, like reference characters identify the same image regions having the same meaning.

FIG. 1 pictorially illustrates an excerpt from an image 100 that includes pixels arrayed in matrix fashion, where each pixel has an associated video information value. The individual pixels are represented in FIG. 1 by boxes arrayed in matrix fashion. In what follows, X denotes a horizontal direction and Y a vertical direction of this pixel matrix. Within this pixel matrix (x, y) denotes the coordinates of an arbitrary point, which is drawn with heavy borders. Pixels having a common y coordinate lie in one row of the image 100; pixels having a common x coordinate lie in a column of the image 100. In what follows, an m×n matrix denotes a pixel matrix having m rows and n columns.

For the further explanation, the X coordinates of the individual pixels increase toward the right and that the Y coordinates of the individual pixels increase downwardly, so that the point of the pixel matrix having coordinates (0, 0) lies in the upper left corner of the matrix.

Associated with each of the individual pixels are video information values, including a brightness (luminance, Y) value and two color contrast (chrominance, UV) values. For purposes of explanation, the technique explained in what follows is applied only to the luminance values associated with the individual pixels. The technique may also be applied in corresponding fashion to the chrominance values as well. In the case of an RGB color representation, wherein color contrast values for the three primary colors red, green and blue are associated with the individual pixels, the technique explained in what follows may be applied separately to the color contrast values for the individual primary colors.

For purposes of explanation, video information values denoted by a1 to h4 are reproduced for a matrix of 4×8 pixels having the pixel (x, y) at its top left corner. Here a1 is the video information value of the pixel (x, y) and h4 is the video information value of the pixel (x+7, y+3) at the bottom right corner of the matrix.

Suppose furthermore that the video information values associated with the individual pixels were obtained by decoding a signal sequence that arose through block-based compression of a video sequence. In the case of lossless encoding and lossless transmission or storage of the encoded signal sequence, the video sequence obtained by decoding the signal sequence matches the originally encoded video sequence. The encoding of video sequences, however, is linked with information losses, which can lead to the artifacts explained at the outset.

In the technique explained in what follows, such artifacts are reduced by detecting the position of artifacts on the basis of the video information values associated with the individual pixels, performing a frequency analysis of the image, modifying frequency components of pixels in those image regions where artifacts were detected, and finally reconstructing the video information values using the modified frequency components.

In what follows, a first filtering technique for frequency analysis of the image content is explained with reference to FIG. 2. In this first technique provision is made for determining, for each of the individual pixels of the image, eight filter coefficients each of which contains an item of frequency information. The determination of these filter coefficients is explained, with reference to FIGS. 2A to 2H, for the pixel (x, y) illustrated in FIG. 1. In each of these figures, the filter schema applied for determining the individual filter coefficient and the resulting filter coefficient for the pixel (x, y) (and also for adjacent pixels in FIGS. 2A to 2C) is reproduced at top left. Again the position of the pixel (x, y) is emphasized by a heavy border. The filter schema tells which of the pixels, starting from the pixel (x, y), are taken with a positive and a negative sign in the determination of the relevant filter coefficient. The sign in the top left corner of the filter schema reproduces the sign with which the pixel (x, y) is taken in the filter coefficient. The remaining signs correspond to the sign of pixels disposed adjacent the pixel (x, y) according to the filter schema.

A first filter coefficient, hereinafter denoted by $HP^H_{2\times2}$, is obtained, with reference to FIG. 2A, by horizontal high-pass filtering in which the video information values of two pixels adjacent in the vertical direction are summed and the video information values of the pixels adjacent these pixels in the horizontal direction are subtracted therefrom. This high-pass filter value $HP^H_{2\times2}$, which is also hereinafter referred to as the horizontal 2×2 filter value, of the pixel (x, y) is described by:

$$HP^H_{2\times2}(x,y) = P(x,y) + P(x,y+1) - P(x+1,y) - P(x+1,y+1). \quad (1a)$$

With reference to FIG. 2B, a second filter coefficient $HP^V_{2\times2}$, which is also hereinafter referred to as the vertical 2×2 filter value, is obtained by vertical high-pass filtering. To this end the video information values of two pixels adjacent in the horizontal direction are summed and the video information values of the pixels adjacent in the vertical direction are subtracted therefrom. The video information values of two pixels adjacent in the horizontal direction thus appear in this filter coefficient with a positive sign, and the video information values of two pixels adjacent these pixels in the vertical direction appear with a negative sign. The vertical 2×2 filter coefficient of the pixel (x, y) is now described by:

$$HP^V_{2\times2}(x,y) = P(x,y) + P(x+1,y) - P(x,y+1) - P(x+1,y-1). \quad (1b)$$

With reference to FIG. 2C, a third filter coefficient $HP^D_{2\times2}$, which is also hereinafter referred to as the diagonal 2×2 filter coefficient, is obtained by diagonal filtering. Video information values of two pixels adjacent in the diagonal direction appear in this filter coefficient $HP^D_{2\times2}$ with a positive sign; the video information values of two further pixels disposed immediately adjacent the other two pixels appear in this filter coefficient $HP^D_{2\times2}$ with a negative sign. This diagonal 2×2 filter coefficient of the pixel (x, y) is described by:

$$HP^D_{2\times2}(x,y) = P(x,y) - P(x+1,y) - P(x,y+1) + P(x+1,y+1) \quad (1c)$$

With reference to FIG. 2D, a fourth filter coefficient $HP^H_{4\times4}$, which is also hereinafter referred to as the horizontal 4×4 filter coefficient, is obtained by summing the video information values of a pixel matrix having 4×2 pixels and having the pixel (x, y) at its top left corner, and subtracting from the resulting sum the sum of the video information values of a 4×2 pixel matrix immediately adjacent in the horizontal direction. The filter coefficient $HP^H_{4\times4}$ of the pixel (x, y) is described by:

$$HP^H_{4\times4}(x, y) = \sum_{i=0}^{1}\sum_{j=0}^{3} P(x+i, y+j) - \sum_{i=0}^{1}\sum_{j=0}^{3} P(x+2+i, y+j). \quad (1d)$$

With reference to FIG. 2E, a fifth filter coefficient $HP^V_{4\times4}$, which is also hereinafter referred to as the vertical 4×4 filter coefficient, is obtained by summing the video information values of a 2×4 pixel matrix and subtracting from the sum so obtained the sum of the video information values of a 2×4 pixel matrix immediately adjacent in the vertical direction. This vertical 4×4 filter coefficient of the pixel (x, y) is thus described by:

$$HP^V_{4\times4}(x, y) = \sum_{i=0}^{3}\sum_{j=0}^{1} P(x+i, y+j) - \sum_{i=0}^{3}\sum_{j=0}^{1} P(x+i, y+2+j). \quad (1e)$$

With reference to FIG. 2F, a sixth filter coefficient $HP^D_{4\times4}$, which is also hereinafter referred to as the diagonal 4×4 filter coefficient, is obtained by summing the video information values of the pixels of two 2×2 pixel matrices adjacent in the diagonal direction and subtracting from the sum obtained in this way the sum of the pixel differences of two further 2×2 pixel matrices immediately adjacent the two first-named 2×2 matrices. This diagonal 4×4 filter coefficient of the pixel (x, y) is thus described by:

$$HP^D_{4\times4}(x, y) = \sum_{i=0}^{1}\sum_{j=0}^{1} P(x+i, y+j) + \sum_{i=0}^{1}\sum_{j=0}^{1} P(x+2+i, y+2+j) - \sum_{i=0}^{1}\sum_{j=0}^{1} P(x+2+i, y+j) - \sum_{i=0}^{1}\sum_{j=0}^{1} P(x+i, y+2+j). \quad (1f)$$

With reference to FIG. 2G, a seventh filter coefficient $HP^H_{4\times8}$ is obtained by summing the video information values of the pixels of a 4×4 pixel matrix and subtracting the sum of the video information values of the pixels of a 4×4 pixel matrix immediately adjacent in the horizontal direction. This filter coefficient $HP^H_{4\times8}$, which is also hereinafter referred to as the horizontal 4×8 filter coefficient, of the pixel (x, y) is described by:

$$HP^H_{4\times8}(x, y) = \sum_{i=0}^{3}\sum_{j=0}^{3} P(x+i, y+j) - \sum_{i=0}^{3}\sum_{j=0}^{3} P(x+4+i, y+j). \quad (1g)$$

The filter coefficients explained above are high-pass filter coefficients or, in the case of the horizontal 4×8 filter coefficient, bandpass filter coefficients. With reference to FIG. 2H, an eighth filter coefficient $LP_{4\times8}$, which is a low-pass filter coefficient, is obtained by summing the video information values of the pixels of a 4×8 pixel matrix. This low-pass filter coefficient of the pixel (x, y) is described by:

$$LP_{4\times8}(x, y) = \sum_{i=0}^{7}\sum_{j=0}^{3} P(x+i, y+j). \quad (1h)$$

Figure 3:
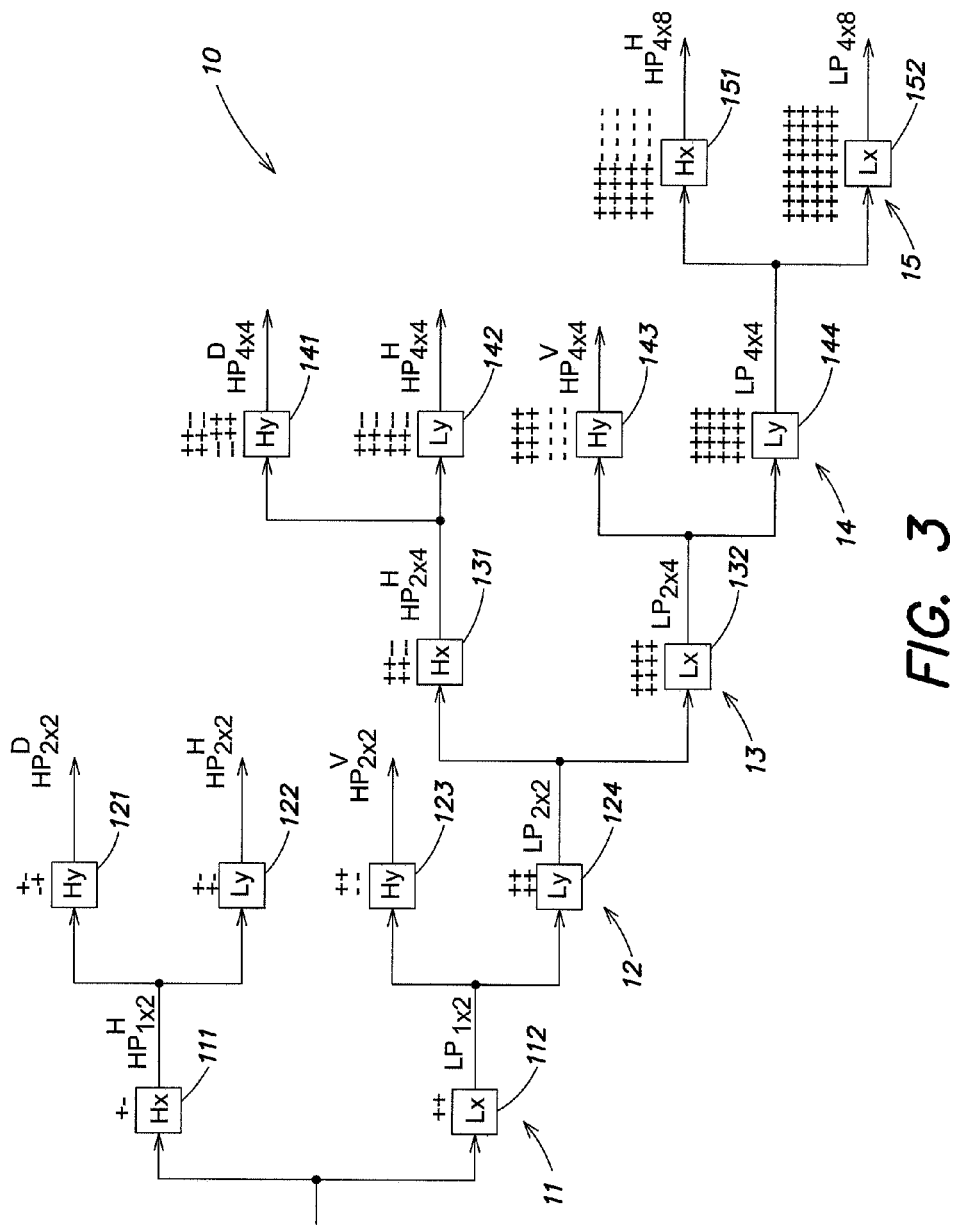
FIG. 3 is a block diagram illustration of a technique for synthesizing/reconstructing a video information value of a pixel on the basis of the filter coefficients.

FIG. 3 is a block diagram illustration of an example of a filter bank by which the eight filter coefficients explained above can be determined in a particularly effective manner, that is, with little computing effort. The filter bank illustrated comprises five successive filter stages 11-15 each with a plurality of filters per filter stage. The filters of filter stages 11-15 in the example are implemented as Haar filters. In the illustrated filter bank, the results of some filters of the individual filter stages are further used by filters of successive filter stages, which constitutes the efficiency of the filter bank illustrated. The video information values of the individual pixels of the image to be filtered are supplied to the illustrated filter bank as input values. In the example illustrated, the individual filters are specified more exactly by letter codes having two letters. Here the first letter stands for the type of filtering, "H" standing for high-pass filtering and "L" for low-pass filtering. The second letter stands for the relevant direction of filtering within the pixel matrix, "x" standing for horizontal filtering and "y" for vertical filtering.

In a first filter stage 11 of filter bank 10, for each pixel, a horizontal high-pass filter value $HP^H_{1\times2}$ is determined by a first filter 111 and a horizontal low-pass filter value $LP_{1\times2}$ by a second filter 112 of this filter stage. Here the high-pass filter value is obtained by subtracting the video information values of two pixels immediately adjacent in the horizontal direction, so that:

$$HP^H_{1\times2}(x,y)=P(x,y)-P(x+1,y), \quad (2a)$$

$$HP^D_{2\times2}(x,y)=HP^H_{1\times2}(x,y)-HP^H_{1\times2}(x,y+1). \quad (2a)$$

The low-pass filter value $LP_{1\times2}$ is obtained by adding the video information values of these pixels adjacent in the horizontal direction, so that:

$$LP_{1\times2}(x,y)=P(x,y)+P(x+1,y), \quad (2b)$$

$$HP^H_{2\times2}(x,y)=HP^H_{1\times2}(x,y)+HP^H_{1\times2}(x,y+1). \quad (2b)$$

In a next second filter stage 12, the filter coefficients $HP^H_{1\times2}$, $LP_{1\times2}$ available at the outputs of the filters 111, 112 are subjected to high-pass filtering in the vertical direction by high-pass filters 121, 123, and to low-pass filtering in the vertical direction by the low-pass filters 122, 124. The filter coefficients of two pixels adjacent in the vertical direction, available at the output of the first filter stage 11, are added by low-pass filtering, while the filter coefficients of two pixels adjacent in the vertical direction, available at the output of the first filter stage, are subtracted by high-pass filtering. The diagonal 2×2 filter coefficients explained with reference to FIG. 2C are available at the output of the first high-pass filter 121, which is supplied with the high-pass filter values of the first filter stage 11. In the filter bank illustrated in FIG. 3, these filter coefficients are given in terms of the high-pass filter coefficients $HP^H_{1\times2}$ of the first filter stage by:

$$HP^D_{2\times2}(x,y)=HP^H_{1\times2}(x,y)-HP^H_{1\times2}(x,y+1). \quad (2c)$$

The horizontal 2×2 filter coefficients $HP^H_{2\times2}$ are available at the output of the first low-pass filter 122 of the second filter stage 12, which is supplied with the high-pass filter coefficients $HP^H_{1\times2}$ of the first filter stage 11. In the case of the filter bank 10 illustrated in FIG. 3, the formula for obtaining these filter coefficients in terms of the high-pass filter coefficients of the first filter stage 11 is:

$$HP^H_{2\times2}(x,y)=HP^H_{1\times2}(x,y)+HP^H_{1\times2}(x,y+1). \quad (2d)$$

The vertical 2×2 filter coefficients $HP^V_{2\times2}$ are available at the output of the second high-pass filter 123 of the second filter stage 12, which is supplied with the low-pass filter coefficients $LP_{1\times2}$ of the first filter stage 11. These vertical filter coefficients $HP^V_{2\times2}$ are described in terms of the low-pass filter coefficients $LP_{1\times2}$ of the first filter stage 11 by:

$$HP^V_{2\times2}(x,y)=LP_{1\times2}(x,y)-LP_{1\times2}(x,y+1). \quad (2e)$$

The 2×2 low-pass filter coefficients $LP_{2\times2}$ are available at the output of the second low-pass filter 124 and are further processed in a third filter stage 13. These 2×2 low-pass filter coefficients $LP_{2\times2}$ are described in terms of the low-pass filter coefficients $LP_{1\times2}$, generated by the first filter stage 11, by:

$$LP_{2\times2}(x,y)=LP_{1\times2}(x,y)+LP_{1\times2}(x,y+1). \quad (2d)$$

In the third filter stage 13, the low-pass filter coefficients $LP_{2\times2}$ of the second filter stage 12 are subjected to high-pass filtering in the horizontal direction with a high-pass filter 131 and to low-pass filtering in the horizontal direction with a low-pass filter 132. The expression "horizontal high-pass filtering" here indicates that the low-pass filter coefficients $LP_{2\times2}$ of two pixels adjacent in the horizontal direction are subtracted. The expression "horizontal low-pass filtering" indicates that the low-pass filter values $LP_{2\times2}$ of two pixels adjacent in the horizontal direction are added. High-pass filter coefficients $HP^H_{2\times4}$ and low-pass filter coefficients $LP_{2\times4}$ are available at the outputs of the two filters 131, 132 and in each case are further processed in a succeeding fourth filter stage 14. The high-pass filter coefficients $HP^H_{2\times4}$ of the third filter stage 13 are described in terms of the low-pass filter coefficients $LP_{2\times2}$ of the second filter stage 12 by:

$$HP^H_{2\times4}=LP_{2\times2}(x,y)-LP_{2\times2}(x+2,y). \quad (3a)$$

Thus in each case the low-pass filter coefficients $LP_{2\times2}$ of two pixels exhibiting a pixel spacing of two (2) in the horizontal direction are subtracted. In corresponding fashion, the low-pass filter coefficients $LP_{2\times4}$ of the third filter stage 13 are described by:

$$LP_{2\times4}=LP_{2\times2}(x,y)+LP_{2\times2}(x+2,y). \quad (3b)$$

Thus the low-pass filter coefficients $LP_{2\times2}$ of pixels exhibiting a pixel spacing of two (2) in the horizontal direction are added.

Fourth filter stage 14 succeeding the third filter stage 13 includes a first high-pass filter 141 and a first low-pass filter 142, which are supplied with the high-pass filter coefficients $HP^H_{2\times4}$ of third filter stage 13, and a second high-pass filter 143 and a second low-pass filter 144, which are supplied with the low-pass filter coefficients $LP_{2\times4}$ of third filter stage 13. The diagonal 4×4 filter coefficients $HP^D_{4\times4}$ are available at the output of first high-pass filter 141. These filter coefficients are described in terms of the high-pass filter coefficients $HP^H_{2\times4}$ of the third filter stage 13 by:

$$HP^D_{4\times4}=HP^H_{2\times4}(x,y)-HP^H_{2\times4}(x,y+2). \quad (4a)$$

Thus these 4×4 filter coefficients are generated by subtracting the high-pass filter coefficients $HP^H_{2\times4}$ of two pixels exhibiting a pixel spacing of two (2) in the vertical direction.

The horizontal 4×4 filter coefficients $HP^H_{4\times4}$ are available at the output of the first low-pass filter 142. These filter coefficients are described in terms of the high-pass filter coefficients $HP^H_{2\times4}$ of the third filter stage 13 by:

$$HP^H_{4\times4}=HP^H_{2\times4}(x,y)+HP^H_{2\times4}(x,y+2). \quad (4b)$$

These filter coefficients $HP^H_{4\times4}$ are thus generated by adding the high-pass filter coefficients $HP^H_{2\times4}$ of two pixels exhibiting a pixel spacing of two (2) in the vertical direction of the image.

The vertical 4×4 filter coefficients $HP^V_{4\times4}$ are available at the output of the second high-pass filter 143. These filter coefficients are described in terms of the low-pass filter coefficients $LP_{2\times4}$ of the third filter stage 13 by:

$$HP^V_{4\times4}=LP_{2\times4}(x,y)-LP_{2\times4}(x,y+2). \quad (4c)$$

These filter coefficients $HP^V_{4\times4}$ are thus generated by subtracting the low-pass filter coefficients $LP_{2\times4}$ of two pixels exhibiting a pixel spacing of two pixels in the vertical direction.

A 4×4 low-pass filter coefficient generated by adding two low-pass filter coefficients $LP_{2\times4}$ of the third filter stage 13 is available at the output of the second low-pass filter 144. These 4×4 low-pass filter coefficients are described by:

$$LP_{4\times4}=LP_{2\times4}(x,y)+LP_{2\times4}(x,y+2) \quad (4d)$$

These 4×4 low-pass filter coefficients are supplied to a fifth and last stage of filter bank 10, which includes a high-pass filter 151 and a low-pass filter 152. The 4×8 filter coefficients $HP^H_{4\times8}$ are available at the output of the high-pass filter 151. These filter coefficients are described in terms of the low-pass filter coefficients $LP_{4\times4}$ of the fourth filter stage 14 by:

$$HP^H_{4\times8}=LP_{4\times4}(x,y)-LP_{4\times4}(x+4,y). \quad (5a)$$

These horizontal 4×8 filter coefficients are thus generated by subtracting the 4×4 low-pass filter coefficients $LP_{4\times4}$ of two pixels exhibiting a pixel spacing of four (4) pixels in the horizontal direction of the image. The 4×8 low-pass filter coefficients explained with reference to FIG. 2H are available at the output of the low-pass filter 152. These 4×8 low-pass filter coefficients are described in terms of the 4×4 low-pass filter coefficients of fourth filter stage 14 by:

$$LP_{4\times8}=LP_{4\times4}(x,y)+LP_{4\times4}(x+4,y). \quad (5b)$$

These 4×8 filter coefficients are thus generated by adding the 4×4 low-pass filter coefficients of two pixels exhibiting a pixel spacing of four pixels in the horizontal direction.

From the eight filter coefficients explained with reference to FIGS. 2A to 2H, which were determined for the individual pixels, the video information values P of the individual pixels may be again reconstructed or synthesized. In what follows, the basic technique for synthesizing these video information values from the filter coefficients determined is explained with reference to FIGS. 4A to 4G, before the modification of individual filter coefficients with the goal of artifact reduction. In the example illustrated, the synthesis explained with reference to seven synthesis steps, each of which is explained with reference to one of FIGS. 4A-4G. What is reproduced in these figures are synthesis equations that successively describe the synthesis of the video information values from filter coefficients and from intermediate values that depend on the filter coefficients. Also represented schematically in these figures, in connection with the individual filter coefficients and intermediate values, are pixel matrices that represent the position of the individual pixels whose video information values are taken into account in the individual filter coefficients or intermediate values. The video information values of the pixels carrying a + sign are here taken with a positive sign in the relevant filter coefficient or the relevant intermediate value, while the video information values of the pixels carrying a − sign are taken with a negative sign.

With reference to FIG. 4A, in a first synthesis step, 4×4 low-pass filter coefficients $LP_{4\times4}$ are determined from horizontal 4×8 filter values $HP^H_{4\times8}$ and from 4×8 low-pass filter values. These filter values $HP^H_{4\times8}$ and $LP_{4\times8}$ for the individual pixels are available after the analysis explained with reference to FIGS. 2A-2H or are associated with the pixels. The 4×4 low-pass filter value is an intermediate value that is needed for the synthesis of the video information values. Each intermediate value $LP_{4\times4}$ is determined by taking account of the high-pass and low-pass filter values of two pixels exhibiting a pixel spacing of four (4) pixels in the horizontal direction. The determination of this intermediate value $LP_{4\times4}$ for the pixel (x, y) is described by:

$$LP_{4\times4}(x,y)=[HP^H_{4\times8}(x,y)-HP^H_{4\times8}(x-4,y)+LP_{4\times8}(x,y)+LP_{4\times8}(x-4,y)]/4. \quad (6a)$$

The low-pass filter value $LP_{4\times4}$ is needed in a further synthesis step explained with reference to FIG. 4C.

In a further synthesis step, illustrated schematically in FIG. 4B, horizontal 2×4 filter coefficients are determined from stored diagonal 4×4 filter coefficients and from vertical 4×4 filter coefficients of two pixels exhibiting a pixel spacing of two pixels in the vertical direction. These horizontal 2×4 high-pass filter coefficients $HP^H_{2\times4}$ are second intermediate values needed in a synthesis step to be explained with reference to FIG. 4B. These intermediate values are described by:

$$-HP^H_{2\times4}(x,y)=[-HP^D_{4\times4}(x,y)+HP^D_{4\times4}(x,y-2)-HP^V_{4\times4}(x,y-2)-HP^V_{4\times4}(x,y)]/4. \quad (6b)$$

FIG. 4C explains a further synthesis step in which 2×4 low-pass filter coefficients are determined from vertical 4×4 filter coefficients $HP^V_{4\times4}$ stored for the individual pixels and from the first intermediate values $LP_{4\times4}$ determined on the basis of the synthesis step of FIG. 4A. Here the vertical 4×4 high-pass filter values and the intermediate values for two pixels exhibiting a pixel spacing of two pixels in the vertical direction of the image are taken into account. The 2×4 low-pass filter values determined on the basis of this synthesis step, which constitute third intermediate values, are now described by:

$$LP_{2\times4}(x,y)=[HP^V_{4\times4}(x,y)-HP^V_{4\times4}(x,y-2)+LP_{4\times4}(x,y)+LP_{4\times4}(x,y-2)]/4. \quad (6c)$$

In a further synthesis step, with reference to FIG. 4D, 2×2 low-pass filter coefficients constituting further intermediate values are calculated on the basis of stored horizontal 2×4 high-pass filter values and on the basis of the intermediate values $LP_{2\times4}$ determined in the synthesis step of FIG. 4C. Here in each case the horizontal high-pass filter values $HP^H_{2\times4}$ and the intermediate values at two pixels exhibiting a pixel spacing of two pixels in the horizontal direction are taken into account. The synthetically determined intermediate values illustrated in FIG. 4D are described by:

$$LP_{2\times 2}(x,y)=[-HP^H_{2\times 4}(x-2,y)+HP^H_{2\times 4}(x,y)+ LP_{2\times 4}(x-2,y)+LP_{2\times 4}(x,y)]/4. \quad (6d)$$

In a further synthesis step, illustrated in FIG. 4E, 1×2 low-pass filter values are determined as further intermediate values. Vertical 2×2 high-pass filter values stored for the individual pixels and the 2×2 low-pass filter values determined on the basis of the synthesis step of FIG. 4D are employed in determining these intermediate values. Here in each case the high-pass filter values and low-pass filter values for two pixels exhibiting a pixel spacing of one pixel, that is, immediately adjacent, in the horizontal direction of the image are taken into account. The intermediate values $LP_{1\times 2}$ determined in this synthesis step are described in terms of the vertical high-pass filter values $HP^V_{2\times 2}$ and the 2×2 low-pass filter values by:

$$LP_{1\times 2}(x,y)=[-HP^V_{2\times 2}(x,y-1)+HP^V_{2\times 2}(x,y)+ LP_{2\times 2}(x,y-1)+LP_{2\times 2}(x,y)]/4. \quad (6e)$$

In a further synthesis step, with reference to FIG. 4F, horizontal 1×2 high-pass filter values, which serve as intermediate values for a last synthesis step explained with reference to FIG. 4G, are calculated from diagonal 2×2 high-pass filter values stored for the individual pixels and from horizontal 2×2 filter values. Here in each case the diagonal and horizontal 2×2 high-pass filter coefficients for two pixels exhibiting a pixel spacing of one pixel in the vertical direction of the image, that is, disposed immediately adjacent one another in the vertical direction, are taken into account. A horizontal 1×2 high-pass filter value $HP^H_{1\times 2}$ determined for a pixel (x, y) is described by:

$$-HP^H_{1\times 2}(x,y)=[HP^D_{2\times 2}(x,y-1)-HP^D_{2\times 2}(x,y)- HP^H_{2\times 2}(x,y-1)-HP^H_{2\times 2}(x,y)]/4. \quad (6f)$$

In a final synthesis step, illustrated in FIG. 4G, the video information values are calculated from the horizontal 1×2 high-pass filter values $HP^H_{1\times 2}$ of the synthesis step of FIG. 4F and from the 1×2 low-pass filter values $LP_{1\times 2}$ of the synthesis step of FIG. 4E. Here in each case the high-pass and low-pass filter values of two pixels exhibiting a pixel spacing of one pixel in the horizontal direction in each case, that is, immediately adjacent one another in the horizontal direction, are taken into account. The video information value P determined from these filter coefficients is described by:

$$P(x,y)=[-HP^H_{1\times 2}(x-1,y)+HP^H_{1\times 2}(x,y)+LP_{1\times 2}(x-1,y)+ LP_{1\times 2}(x,y)]/4. \quad (6g)$$

Figures 5A, 5B, 5C:
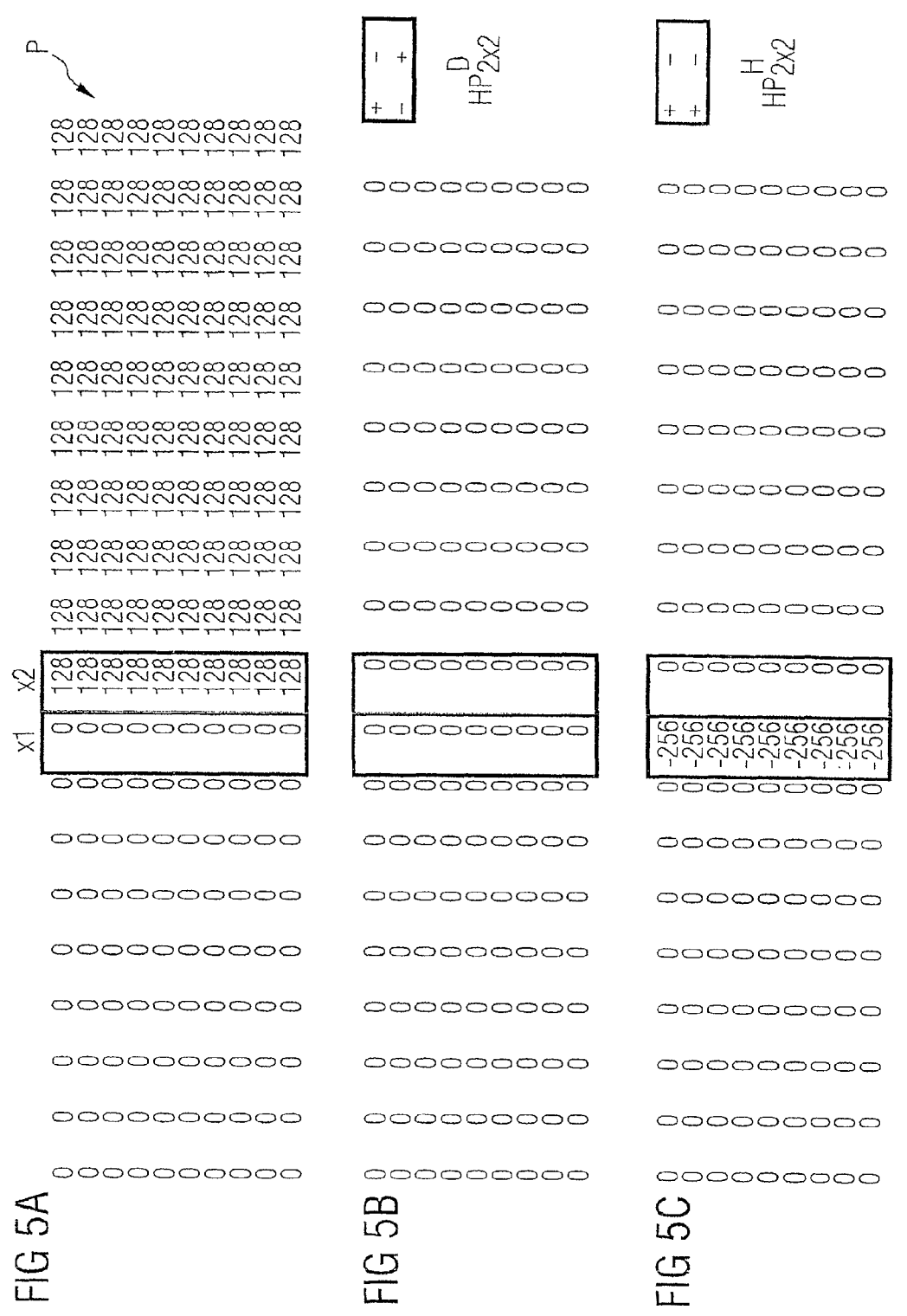

The impact of an edge running through the image in the vertical direction on the individual filter coefficients is explained in what follows with reference to FIGS. 5A-5J. FIG. 5A depicts a matrix having video information values, it being supposed for the following explanation that the video information values disposed in a row are for pixels of one row of the pixel matrix according to FIG. 1. Such an edge in the run of the image arises when there is a discontinuous change in video information values between two given columns of the pixel matrix. In the case of the pixel matrix of FIG. 5A a vertical edge is present in the run of the image between columns x1, x2 of the pixel matrix. This is represented in FIG. 5A in that video information values of pixels of column x1 and of columns to the left of this column x1 exhibit a first video information value, 0 in the example, and video information values of pixels of column x2 and of columns adjacent to the right of column x2 exhibit a second video information value, 128 in the example. The video information values reproduced in FIG. 5A are for example luminance values, the low value (0) standing for example for a low luminance or for black pixels and the high luminance value (128) standing for a high luminance or white pixels. Depending on the implementation of the system, low luminance values may also represent high luminances and high luminance values may represent low luminances.

The video information values cited in FIG. 5A being taken into account, FIGS. 5B-5H and 5J illustrate the diagonal 2×2 filter coefficients $HP^D_{2\times 2}$ (FIG. 5B), the horizontal 2×2 filter coefficients $HP^H_{2\times 2}$ (FIG. 5C), the vertical 2×2 filter coefficients $HP^V_{2\times 2}$ (FIG. 5D), the diagonal 4×4 filter coefficients $HP^D_{4\times 4}$ (FIG. 5E), the horizontal 4×4 filter coefficients $HP^H_{4\times 4}$ (FIG. 5F), the vertical 4×4 filter coefficients $HP^V_{4\times 4}$ (FIG. 5G), the horizontal 4×8 filter coefficients $HP^H_{4\times 8}$ (FIG. 5H) and the low-pass filter coefficients $LP_{4\times 8}$ (FIG. 5J) for the individual pixels of the pixel matrix. For better orientation, the video information values (FIG. 5A) and the filter coefficients (FIGS. 5B to 5J) for the pixels of columns x1, x2, between which there is a discontinuous change in the video information values, are illustrated with a border in each case.

For the situation illustrated in FIG. 5A, with first video information values for pixels to the left of the edge and second video information values for pixels to the right of the edge, the diagonal and vertical filter coefficients are each 0, as is illustrated in FIGS. 5B, 5D, 5E and 5G. For the situation illustrated in FIG. 5A, the horizontal 2×2 filter coefficients $HP^H_{2\times 2}$ of the pixels of column x1, that is, the column lying to the left of the vertical edge, and the horizontal 4×4 filter coefficients of column x1 lying to the left of the edge and of the two columns x1−1, x1−2 adjacent this column x1 on the left, are nonzero. What is more, the horizontal 4×4 filter coefficients of column x1 and of the six columns x1−1, . . . , x1−6 adjacent this column x1 on the left are nonzero. In addition, the low-pass filter coefficients to the right starting from column x1−6 are also nonzero, although these will not be examined more closely in what follows.

With the exception of the low-pass filter coefficients, filter coefficients exhibiting a nonzero filter coefficient in consequence of the edge between columns x1 and x2 are hereinafter referred to as filter coefficients "excited by the edge." In the example illustrated, these are the horizontal 2×2, 4×4 and 4×8 filter coefficients explained above.

Figure 6A:
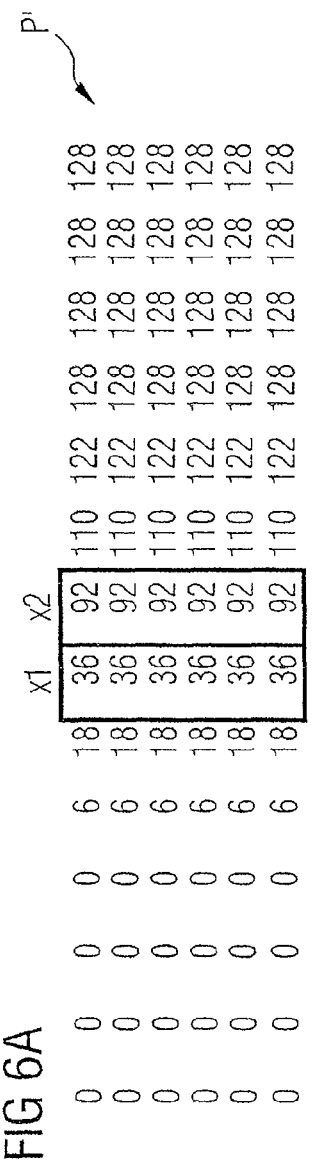
FIGS. 6A-6B illustrate video information values obtained for the image of FIG. 5A by synthesis from filter coefficients, for a case where individual filter coefficients are modified before synthesis with the aim of flattening the run of the edge in the image.
Figure 6B:
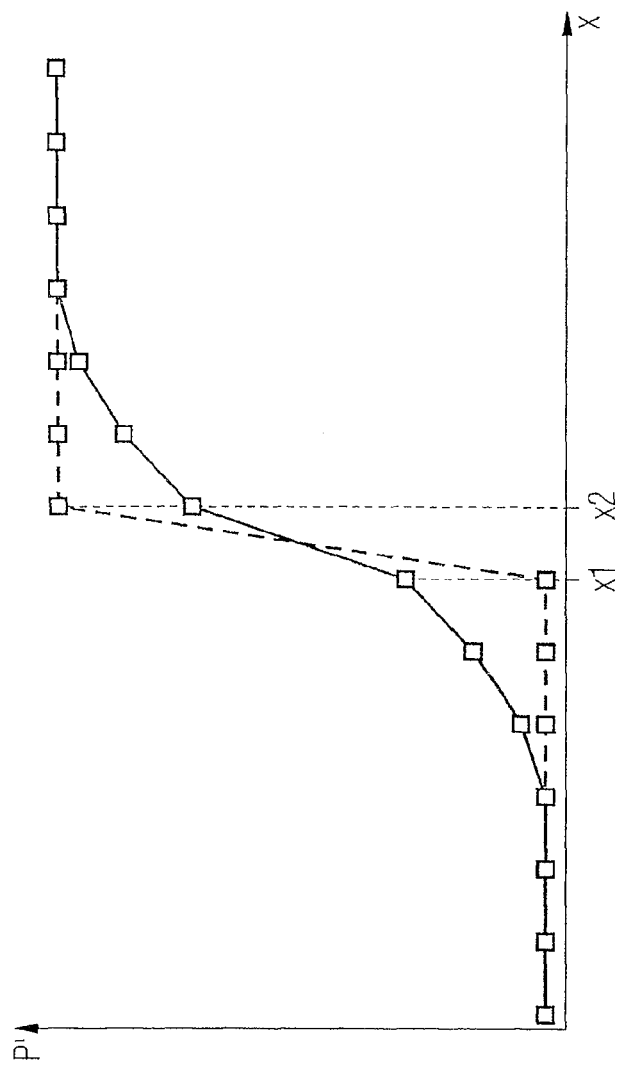

As was already explained at the outset, blocking artifacts are edges or jumps in the run of the image resulting from block-based data compression. Such blocking artifacts in an image reconstructed from the compressed data can be reduced by "flattening" a discontinuous run of the video information values. This can be achieved by reducing the amplitude of filter coefficients excited by the edge in question. By way of example, FIG. 6A depicts video information values P' obtained by synthesis with the use of filter coefficients determined for each pixel, for the case where the horizontal 2×2 filter coefficients $HP^H_{2\times 2}$ excited by the edge between columns x1, x2 (compare FIG. 5C) and the horizontal 4×4 filter coefficients $HP^H_{4\times 4}$ excited by this jump (compare FIG. 5F) are reduced to a quarter of their amplitude. The result is a flattened rise in the video information values in the horizontal direction in the region of the original edge between columns x1, x2. The reconstructed video information values P' of a row in the region of this transition are illustrated as a solid line in FIG. 6B. The original video information values P according to FIG. 5A are illustrated here as a dashed line.

In correspondence with the representation in FIGS. 5A-5H and 5J, FIGS. 7A-7H and 7J illustrate an edge running through the image in the horizontal direction. In the example this edge lies between image rows y1 and y2. The video information values of image row y1 and of the image rows lying above this image row y1 have for example a video information value of 0, while the pixels of image row y2 and of the image rows lying below this image row y2 in the vertical direction exhibit for example a video information value of 128. With reference to FIGS. 7D and 7G, vertical 2×2 filter coefficients $HP^V_{2 \times 2}$ of the image row y1 as well as vertical 4×4 filter coefficients $HP^V_{4 \times 4}$ of the image row y1 and of the two image rows y1−1, y1−2 disposed above this image row y1 are excited by this edge running between rows y1 and y2. FIG. 8A illustrates the video information values P' reconstructed on the basis of the filter coefficients for the case where the excited vertical 2×2 filter coefficients (compare FIG. 7D) and the excited vertical 4×4 filter coefficients (compare FIG. 7G) are reduced to a quarter of their amplitude. The result is an edge flattened in the horizontal direction in comparison with the situation of FIG. 7A. Video information values of a column in the region of this edge are illustrated as a solid line in FIG. 8B. The discontinuous run of the video information values within a column in the situation illustrated in FIG. 7A is illustrated as a dashed line in FIG. 8B.

In summary, edges in the run of the image may be flattened by performing an analysis to determine filter coefficients for individual pixels of the image, reducing in amplitude the filter coefficients excited by an edge in the run of the image and subsequently reconstructing the video information values with the use of the filter coefficients, some of which can be modified. In order to reduce blocking artifacts here, it is necessary to determine positions of such blocking artifacts within the image, that is, to determine the positions of edges in the run of the image that are part of the blocking artifacts, and—the position of the edges being known—to determine filter coefficients of those pixels that are excited by the edge. The position of the pixels having filter coefficients excited by the edge is the same in relation to the position of the edge and depends on the relevant analytical method used to determine the filter coefficients.

One possible method for detecting edges that are blocking artifacts is explained with reference to FIG. 9. What are used for detecting such blocking artifacts are the original video information values, that is, the same video information values on which the analysis aimed at generating the filter coefficients was based.

Figure 9:
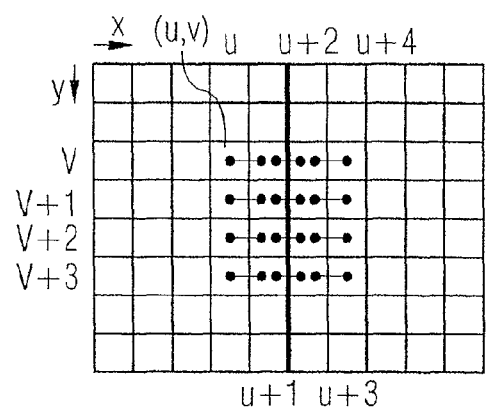
FIG. 9 pictorially illustrates a technique for detecting block boundaries within an image.

FIG. 9 depicts in excerpt form the pixel matrix having pixels where each pixel has an associated information value. The detection method yields an item of information as to whether an edge is present in the run of the image at a specified position. By way of explanation, consider a possible edge position between a first column u+1 and a second column u+2, illustrated by a heavy line. In order to detect an edge running in the vertical direction between first and second columns u+1, u+2, provision is made for determining a first pixel difference value, which depends on the pixel difference of at least one pixel pair exhibiting two pixels disposed adjacent to one another in the horizontal direction. A first of these pixels of the pixel pair is disposed in first column u+1 or to the left of first column u+1, that is, to the left of the edge, and a second pixel of the pixel pair is disposed in second column u+2 or to the right of second column u+2, that is, to the right of the edge. In what follows, the expression "pixel difference of a pixel pair" denotes a value that depends on the difference of the video information values of the pixels of this pixel pair. This pixel difference is for example the absolute value or an even multiple of the difference of the video information values.

Furthermore, provision is made for determining two further pixel difference values, namely a second pixel difference value that depends on the pixel difference of a second pixel pair lying to the left of the edge in the horizontal direction and a third pixel difference value that depends on the pixel difference of a third pixel pair lying next to and to the right of the first pixel pair in the horizontal direction. The three pixel pairs lie for example in the same row of the image. With reference to FIG. 9, in a row v for example, a first pixel pair is formed by the pixels (u+1, v) and (u+2, v), which are disposed immediately adjacent one another and thus exhibit a pixel spacing of 1. In order to determine the first pixel difference, however, pixels to the left and to the right of the edge position and having a pixel spacing greater than 1 may also be employed. The second pixel pair comprises for example the immediately adjacent pixels (u, v) and (u+1, v), and the third pixel pair comprises for example the immediately adjacent pixels (u+2, v) and (u+3, v). The pixels of the second and third pixel pairs need not be disposed immediately adjacent one another but may also exhibit a pixel spacing greater than 1. A first criterion for the presence of an edge between the columns u+1 and u+2 under examination is satisfied for example when the second and third pixel difference values are much smaller than the first pixel difference value. A second criterion for the presence of a blocking artifact exists if the first pixel difference value is smaller than a specified threshold value. Here it is posited that first pixel difference values that are larger than this threshold value do not result from a blocking artifact but result from an edge in the run of the image given by the image content. The presence of a blocking artifact for an edge position under examination is posited when both of the criteria explained above are satisfied.

In order to reduce the danger of an erroneous or incorrect detection, it is possible to examine a plurality of, for example four, adjacent rows. In order to determine the first pixel difference value, for example, first pixel differences from this plurality of rows are summed, and in order to determine the second and third pixel difference values, second and third pixel differences from this plurality of rows are summed. For the scenario illustrated in FIG. 9, where pixel pairs of four adjacent rows are considered and where the first and second pixel pairs and the first and third pixel pairs in each row possess a pixel in common, the first pixel difference value S1 is described for example by:

$$S1 = \sum_{i=o}^{3} |P(u+1, v+i) - P(u+2, v+i)|. \quad (7a)$$

In the example illustrated, the second pixel difference value is described by:

$$S2 = \sum_{i=o}^{3} |P(u, v+i) - P(u+1, v+i)|, \quad (7b)$$

and the third pixel difference value is described by:

$$S3 = \sum_{i=o}^{3} |P(u+2, v+i) - P(u+3, v+i)|. \quad (7c)$$

Instead of the absolute values it is also possible for example to sum even powers of the differences of the video information values. With allowance for these three pixel difference values, a first criterion for the presence of a blocking artifact is given if the first pixel difference value S1 is much larger than the second pixel difference value and the third pixel difference value, that is, if $$S1 >> S2 \wedge S1 >> S3. \tag{8a}$$

In this context "much larger" means that the first criterion is satisfied for example when the second and third pixel difference values S2, S3 are each smaller than a·S1, where 0<a<0.1 . . . 0.5, or when the ratio between the first pixel difference value and the second and third pixel difference values is larger than a specified value, for example a value between 5 and 10. Instead of comparing the first pixel difference value with two values, namely the second and the third pixel difference values, the mean of the second and third pixel difference values may be formed and the first pixel difference value may be compared with this mean.

In an exemplary embodiment, provision is made for determining a local blocking measure LBM described by:

$$LBM=-S3+S1-S2. \tag{8b}$$

In this case a first criterion for a blocking artifact is satisfied for example when this local blocking measure is greater than zero, that is, when the first pixel difference value is greater than the sum of the second and third pixel difference values.

A second criterion for the presence of a blocking artifact is satisfied if the first pixel difference value is smaller than a specified first threshold value, that is, if:

$$S1<th1. \tag{8c}$$

Here th1 denotes the first threshold value, whose absolute value depends on the number of pixel differences that are summed and depends on the value range within which the video information values of the individual pixels can fall. This threshold value sets a limit for the intensity of an edge at which artifact reduction can take place. If the first pixel difference value is above this threshold, it is presumed that the edge results from the image content and not from blockwise encoding of the image, so no filtering for artifact reduction is expected.

If for example, on consideration of the two criteria explained above, a blocking artifact is detected at a boundary between two columns of the pixel matrix, the horizontal 2×2 filter coefficients and the horizontal 4×4 filter coefficients excited by the detected edge are reduced in amplitude in the fashion explained. The position, relative to the edge, of the pixels whose filter coefficients are excited by the edge depends on, among other things, how the filter coefficients are generated. For the horizontal 2×2 and 4×4 filter coefficients explained with reference to FIG. 2, it is now the case, with reference to FIGS. 5A-5J, that the filter coefficients of those pixels located in a column immediately adjacent the edge on the left or located in three columns immediately adjacent the edge on the left are the ones excited.

In an exemplary embodiment, the amplitude reduction of the individual filter coefficients excited by an edge depends on the measure of the change in the video information values at the edge, that is, on a gradient of the pixel information values at the edge. If the two criteria explained above for the presence of a blocking artifact are satisfied, the excited filter coefficients are reduced in dependence, for example, on the absolute value of the first pixel difference or in dependence on the sum of the absolute values of the first pixel differences. The reduction of the filter coefficients here is for example greater the larger this amplitude is. The excited filter coefficients are preferably not reduced to zero. In an exemplary embodiment provision is made for reducing the excited filter coefficients to 75%, 50% or 25% of their initial value in dependence on the first pixel difference.

In a further exemplary embodiment provision is made for employing the local blocking measure LBM according to formula (8b) as a measure for the reduction of the filter coefficients. If the local blocking measure is less than zero, no reduction of filter coefficients takes place because in this case there is no presumption that a blocking artifact is present. For values of the blocking measure LBM greater than zero, a fixedly specified value may be employed as the measure of the reduction of the filter coefficients. In another embodiment, various reduction factors may be provided. A threshold value is associated with each of these reduction factors. A given reduction factor is applied here if the local blocking mass exceeds the threshold value associated with this reduction factor but does not exceed the next larger threshold value, which is associated with a further reduction factor. The reduction factors are so chosen that they grow larger as the threshold values increase; that is, large reduction factors effecting a strong reduction are associated with large threshold values. If the local blocking mass exceeds a largest of the threshold values, then for example the reduction factor is 100% and the relevant filter coefficient is thus set equal to zero. In correspondence with the example explained above, for example, four reduction factors are provided: 25% for small local blocking measures and furthermore 50%, 75% and 100% for larger local blocking measures.

The detection of edges of blocking artifacts running in the horizontal direction takes place analogously to the explanations to FIG. 9, pixel pairs disposed in a column instead of pixel pairs disposed in a row being considered in each case for the detection of horizontal edges. Upon detection of a horizontally running edge of a blocking artifact, with reference to the explanations to FIG. 7, for example the vertical 2×2 filter coefficients and the vertical 4×4 filter coefficients excited by the edge are then modified.

Figure 10:
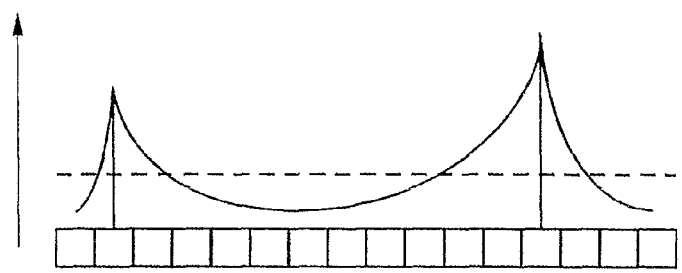
FIG. 10 serves to explain a technique for detecting a global block grid within an image.

Alternatively or additionally to the (local) blocking artifact detection method explained with reference to FIG. 9, it is possible to determine globally a block grid for the entire image. In order to detect the presence of a vertical block boundary at a specified position, a determination is made, for example for at least a majority of the rows, whether the two above-named criteria for the presence of an edge at the given position are satisfied. Here the presence of a block boundary is posited for example when the number of rows for which the blocking criterion is satisfied at a given position is significantly greater than for adjacent positions, that is (in the case of the detection of a vertical edge), for positions lying next to the given position on the left or on the right in the row direction. In other words, the presence of a vertical block boundary at a given position is posited when the number of rows for which the blocking criterion is satisfied at the given position attains a maximum in locally significant fashion. In FIG. 10, for example, the plot shows for various edge positions the number of rows in which both criteria for the presence of an edge at the relevant position are satisfied. The dashed line here represents a mean. In the example illustrated, the number of rows for which the edge criterion is satisfied reaches a local maximum for two positions, so that the presence of a block boundary is posited for these two positions. The detection of a horizontal block boundary takes place in corresponding fashion.

The detection of the local block grid rests on a statistical analysis in which it is determined how often a blocking pattern occurs in a row/column or how often the blocking criterion is satisfied. Under some circumstances, however, this may not be sufficient to classify an individual column/row as a blocking column, in particular because, along with edges resulting from the block grid, there may be edges resulting from the normal image content that can lead to "failures" in the detection of the block grid.

Models can be generated for the block grid in order to avoid such problems. Here each model represents or defines a block grid in view of horizontal and vertical dimensions (spacing) of the blocks of the grid and in view of a displacement (offset) of the individual grids in the vertical and horizontal directions relative to a specified position, so that there are four degrees of freedom for a grid. By considering the previously performed statistical analysis a determination is then made which of the block models best fits the statistical analysis. This model is then employed for the determination of blocking artifacts.

The statistical analysis explained above may be applied to the entire image but may also be applied to a window having for example 32 columns or to a window having for example 32 rows, which moves over the image. The columns or rows of such a window extend over the image height or image width.

In an exemplary embodiment, provision is made that filter coefficients lying in the "excitation region" of an edge are modified only when the edge lies at a boundary of the block grid and when the criteria for the presence of a blocking artifact, explained with reference to formulas (8a) and (8b), are satisfied. The determination of a block boundary running in the horizontal direction is carried out in analogous fashion by determining, for two adjacent rows, the number of columns for which the three pixel pairs satisfy the conditions of formulas (8a) and (8b).

In an exemplary embodiment, provision is made for determining, globally for the entire image, a measure by which the filter coefficients may be reduced at most after the detection of a blocking artifact.

To this end for example a global "blocking intensity" is determined for the image, and a reduction factor by which the excited filter coefficients are reduced is set in dependence on this blocking intensity. The reduction factor is larger the greater the blocking intensity. Here the blocking intensity is a measure for the difference of video information values of those pixels that are disposed adjacent one another along block boundaries in a direction transverse to the block boundary.

For determining the blocking intensity, for example, the pixel differences of pixel pairs distributed over the entire image and disposed in each case adjacent one another transversely to a block boundary are determined and summed. Additionally, the pixel differences are determined for those pixel pairs lying in the same row or the same column as the previously determined pixel pairs but disposed a distance from the block boundary. The pixel differences of these further pixel pairs are likewise summed, and the resulting second sum is subtracted from the first sum. The result is the blocking intensity for the entire image, which will also be referred to hereinafter as the blocking measure. Here pixel pairs and pixel pairs adjacent these pixel pairs along block boundaries may be determined in order to determine the blocking measure. It is moreover possible to determine a fixedly specified number of pixel pairs disposed along the block boundaries but arbitrarily distributed over the image. With reference to FIG. 9 and on the assumption that an edge runs between columns u+1 and u+2, the blocking measure is determined for example by considering a first pixel pair having the pixels (u+1, v) and (u+2, v), which are disposed adjacent one another transversely to the block boundary, as well as a second pixel pair having the pixels (u+3, v) and (u+4, v). The pixels of the second pixel pair lie adjacent the pixels of the first pixel pair in the direction transverse to the block boundary and thus a distance from the block boundary. Here the second pixel pair may be immediately adjacent the first pixel pair but also may be disposed a distance from the first pixel pair. A fraction BI' of the blocking measure for the entire image resulting from these two pixel pairs is described for example by:

$$BI'=|P(u+1,v)-P(u+2,v)|-|P(u+3,v)-P(u+4,v)|. \quad (9)$$

Here such a blocking measure fraction BI' is determined in the fashion explained for a multiplicity of pixel pairs distributed over the entire image, and the blocking measure fractions so obtained are summed in order to arrive at the blocking measure for the entire image, which is thus described by:

$$BI=\Sigma BI'. \quad (10)$$

On the basis of the global blocking measure BI so obtained, a reduction factor is determined for the filter coefficients excited by the individual block edges.

Here the actual reduction of the filter coefficients can take place in dependence on the local blocking measure (compare formula 8b) within the limits specified by the global blocking measure. If the reduction factor determined on the basis of the global blocking measure is for example 75% and if the local reduction factor determined on the basis of the local blocking measure is for example 50%, then the actual reduction factor equals for example the product of the global and local reduction factors, that is, 75%·50% 37.5% in the example.

In a further exemplary embodiment provision is made that the reduction factor determined on the basis of the global blocking measure is employed as an upper limit for the actual reduction factor. Here the local reduction factor is employed as a reduction factor if it is less than or equal to the maximum reduction factor, and the maximum reduction factor is employed as the reduction factor if the local reduction factor is greater than the maximum reduction factor.

In the previously explained examples of blocking artifact reduction, provision is made for detecting block boundaries and for modifying filter coefficients excited by a detected block boundary by reducing their amplitude value. In a further example, provision is made for carrying out low-pass filtering in order to modify the excited filter coefficients in the region of a block boundary. The danger of inserting additional artifacts by modifying the filter coefficients is reduced here in comparison to a mere reduction of filter coefficients. In what follows, the modification of filter coefficients by low-pass filtering is illustrated with reference to FIGS. 11A to 11B.

Figure 11A:
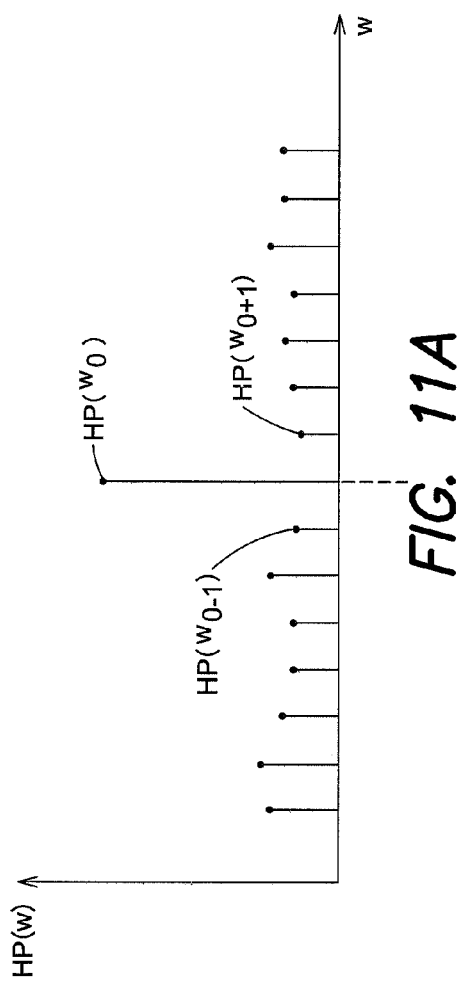
FIGS. 11A-11B pictorially illustrate an example of modification of filter coefficients in the case of blocking artifacts.

By way of example, FIG. 11A depicts the amplitude values of the HP filter coefficients of one type for pixels adjacent in the horizontal direction or the vertical direction in an image. These filter coefficients are for example high-pass filter coefficients of one of the types already explained, such as for example $HP^V_{2\times2}(x, y)$, $HP^H_{2\times2}(x, y)$, $HP^H_{4\times4}(x, y)$ or $HP^V_{4\times4}(x, y)$. Filter coefficients other than the filter coefficients explained above may be determined in the analysis explained at the outset.

In FIG. 11A, $HP(w_0)$ denotes a filter coefficient excited by a block boundary. In this connection $w_0$ denotes a horizontal or a vertical coordinate depending on whether the filter coefficients illustrated are filter coefficients representing high-pass filtering in the horizontal direction or in the vertical direction. For a filter coefficient representing high-pass filtering in the horizontal direction, such as for example $HP^H_{2\times2}(x, y)$ or $HP^H_{4\times4}(x, y)$, $w_0$ stands for a horizontal coordinate or x coordinate. Here a modification of the filter coefficient $HP(w_0)$ of a pixel takes place with the use of the filter coefficients of horizontally adjacent pixels. For a filter coefficient that represents high-pass filtering in the vertical direction, such as for example $HP^V_{2\times2}(x, y)$ or $HP^V_{4\times4}(x, y)$, $w_0$ stands for a vertical coordinate or y coordinate. Here a modification of the filter coefficient $HP(w_0)$ of a pixel takes place with the use of the filter coefficients of vertically adjacent pixels.

Figure 11B:
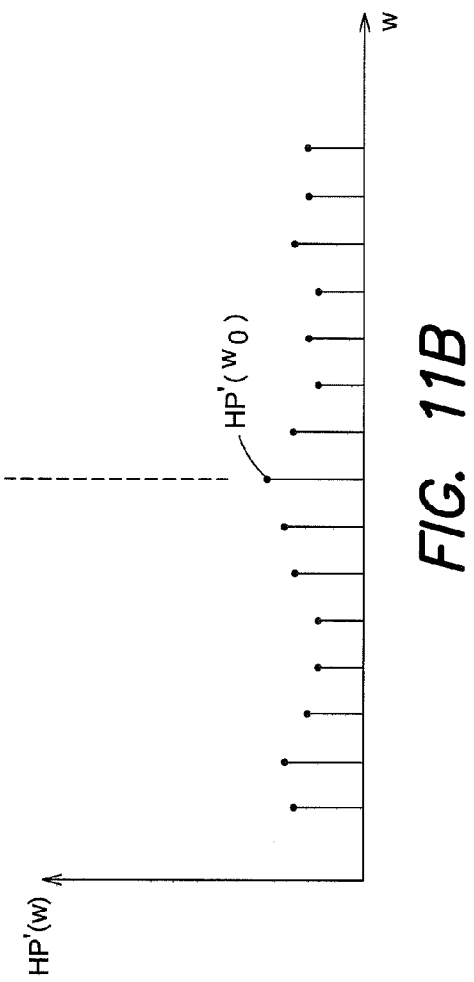

For the modification of the excited filter coefficient, provision is made for calculating a low-pass filter value $HP'(w_0)$, taking adjacent filter coefficients into account, and replacing the excited filter coefficient with the low-pass filter value, as in the result illustrated in FIG. 11B. An arbitrary low-pass filter is suitable as the low-pass filter for determining the low-pass filter value. In an example, provision is made for calculating the low-pass filter value $HP'(w_0)$ as follows:

$$HP'(w_0) = \frac{HP(w_0 - 1) + 2 \cdot HP(w_0) + HP(w_0 + 1)}{4}. \quad (11)$$

The low-pass filter of this example has a filter length of 3 and filter coefficients ¼, ½, ¼. Filters having a longer filter length can of course be used for low-pass filtering.

Provision is also made in the example illustrated for using low-pass filtering to modify not only the excited filter coefficient but also adjacent filter coefficients such as for example the filter coefficients $HP(w_0-1)$, $HP(w_0+1)$.

Ringing artifacts may occur at sharp edges in the run of the image. For reducing such ringing artifacts, provision is made for determining such sharp edges in the run of the image and reducing the filter coefficients of those pixels that are disposed along the edges. In the region of so-called textures, that is, in the region of those image regions in which a plurality of sharp edges succeed one another, thus in which such regular edges occur in succession, no reduction of the filter coefficients is expected, because ringing artifacts hardly arise in the region of such textures, and because reducing the filter coefficients would lead to a visible contrast reduction in the region of the runs of edges.

Figure 12:
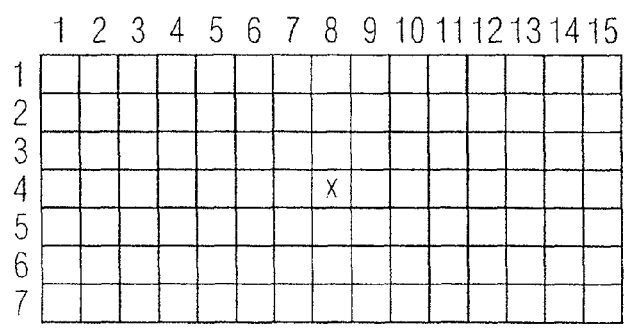
FIG. 12 pictorially illustrates an image region analyzed for detection of ringing artifacts and illustrates the position of the pixels whose filter coefficients are modified upon the detection of a ringing artifact.

In order to decide whether the filter coefficients of a pixel are to be reduced so as to reduce ringing artifacts, provision is made in an exemplary embodiment for examining more closely an image region containing the pixel, with an eye to the presence of sharp edges and possible textures. With reference to FIG. 12, this examined image region comprises for example seven rows and fifteen columns. Here the pixel whose filter coefficients are considered for reduction is disposed centrally within the examined image region; that is, the examined image region is symmetric about this pixel. By way of illustration, this pixel is marked "X" in FIG. 12.

In a first examination step, for column pairs having two adjacent columns, the pixel differences are determined for pixel pairs each having one pixel in one column and another pixel in the other column, and the absolute values or even powers of the pixel differences so obtained are summed. The pixel difference values so obtained for column pairs, which pixel difference values constitute a measure for a gradient of the video information values at the relevant boundary between two columns, are compared with a specified first threshold value. If the difference value determined exceeds a specified threshold value, it is posited that an edge is present in the run of the image at the relevant column boundary. If, however, the difference value determined exceeds this limit for more than a specified number of column pairs, it is posited that the image region under consideration is a textured image region. There is then no modification of the filter coefficients in order to reduce ringing artifacts.

In corresponding fashion, for adjacent row pairs of the examined image region, pixel difference values are determined by determining the pixel differences of pixel pairs each exhibiting one pixel in one row and one pixel in the adjacent row and by summing the absolute values or even powers of these pixel differences. These pixel difference values obtained for the row pairs are compared with a second threshold value. If the pixel difference value for a row pair exceeds the second threshold value, it is posited that an edge is present in the run of the image at the relevant row boundary. If, however, the number of row pairs for which the pixel difference values lie above the second threshold value exceeds a specified number, there is no modification of the filter coefficients in order to reduce ringing artifacts, because in this case the presence of a texture in the image region under consideration is presumed.

In summary, the filter coefficients of the pixel lying centrally in the examined image region are modified when two criteria are satisfied that together indicate the presence of possible ringing artifacts. A first criterion is satisfied when the pixel difference value of at least one column pair of the examined image region is greater than the specified first threshold value or when the pixel difference value of at least one row pair of the examined image region is greater than the specified second threshold. A second criterion exists when the number of column pairs for which the pixel difference values are larger than the first threshold value is less than a specified first number and when the number of row pairs for which the pixel differences are larger than the specified second threshold is less than a specified second number. The first criterion is satisfied if there is at least one edge in the horizontal or vertical direction. The second criterion is satisfied if the edge is not a constituent of a texture, that is, a structure having a plurality of edges. The thresholds may differ with which the pixel difference values are compared in order to investigate the existence of the first and second criteria. Thus, if the existence of the first criterion is being investigated, the pixel difference values may be compared for example with a first threshold value (edge threshold value) and, if the existence of the second criterion is being investigated, for example with a second threshold value (texture threshold value).

A texture is detected if more than some 33%-50% of the differences exceed the texture threshold value. The second criterion is thus satisfied when more than 33%-50% lie below the texture threshold value.

For the investigation of the first criterion explained above, provision is made in an exemplary embodiment for normalizing pixel difference values obtained for the individual column pairs and those obtained for the individual row pairs; this is effected by dividing these pixel difference values by the number of pixel values contained in one column or by the number of pixel values contained in one row. The normalized pixel difference values so obtained for individual column pairs and individual row pairs may then be compared with a common threshold value, the presence of an edge between two columns of the examined image region or the presence of an edge between two rows of the examined image region being posited when the normalized pixel difference value for the two columns or when the normalized pixel difference value for the two rows exceeds the specified threshold value. In an exemplary embodiment provision is made for modifying only horizontal filter coefficients if the two criteria explained above are satisfied only for columns of the examined image region and for modifying only the vertical filter coefficients if the two criteria explained above are satisfied only for rows of the examined image region. Provision is made in a further embodiment for modifying both the horizontal and also the vertical filter coefficients if the two criteria explained above are satisfied for columns and/or rows of the examined image region. Then for example all the 2×2 filter coefficients explained above and all the 4×4 filter coefficients explained above—that is, the horizontal, vertical and diagonal 2×2 and 4×4 filter coefficients—are modified.

Figure 13A:
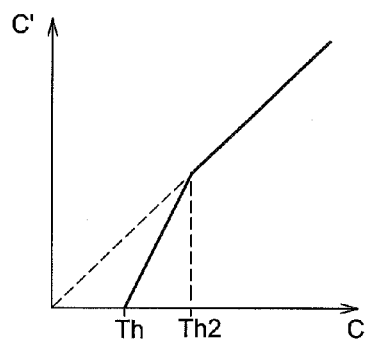
FIGS. 13A-13B graphically illustrate the modification of filter coefficients upon the detection of a ringing artifact.

If an examination of the criteria explained above indicates that there is no texture, then the filter coefficients are modified. In order to explain the modification of the filter coefficients, FIG. 13A depicts a characteristic plot for modifying the filter coefficients. Here C stands for a filter coefficient determined on the basis of the analysis and to be modified. C' stands for the modified filter coefficient. Filter coefficients smaller than a first threshold value Th1 are set equal to zero. Filter coefficients larger than a second threshold value Th2 are not changed. Filter coefficients lying within these two threshold values Th, Th2 are damped. The second threshold value Th2 is twice as large as the first threshold value Th, so that Th2=2·Th.

Figure 13B:
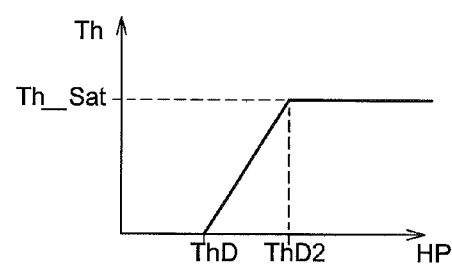

Provision is made in an exemplary embodiment for setting the threshold values in dependence on the properties of the examined image region, as is illustrated in what follows with reference to FIG. 13B for the first threshold value Th. Here this threshold value Th depends on a maximum gradient HP determined in the horizontal or vertical direction of the examined image region. This maximum gradient HP is equal for example to the maximum of the normalized pixel difference values determined for the examined image region in both the column direction and the row direction. For a small maximum gradient HP, that is, for values smaller than a first gradient threshold ThD, the first threshold value Th of the coring characteristic according to FIG. 13A is to zero. This is equivalent to the proposition that the filter coefficients are not modified for small maximum gradients. For maximum gradients larger than the first gradient value ThD, the first threshold value Th takes on values greater than zero. Now the threshold value Th is bounded above to a limiting value Th_Sat. The first threshold Th takes on this limiting value for gradients larger than a second gradient threshold value ThD2. This second gradient threshold value ThD2 is described for example by ThD2=2·ThD.

The threshold values of the coring characteristic are thus adaptively chosen and depend on the value of a filter coefficient determined for the examined pixel.

The methods explained above may be performed successively by, for example, first modifying the filter coefficients in order to reduce blocking artifacts and by then modifying the filter coefficients in order to reduce ringing artifacts, using the characteristics explained with reference to FIGS. 13A-13B. Here there may be filter coefficients that are modified twice, that is, to reduce blocking artifacts and also to reduce ringing artifacts; modified just once, that is, either to reduce blocking artifacts or to reduce ringing artifacts; or not modified.

Figure 14:
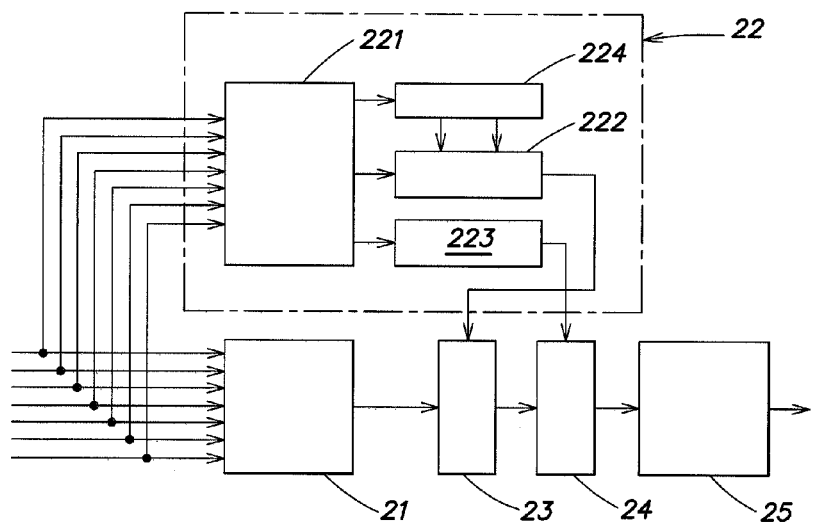
FIG. 14 is a block diagram illustration of a system for analyzing the image content wherein, for each of the individual pixels, where a plurality of filter coefficients depend on video information values of adjacent pixels.

On the basis of a block diagram, FIG. 14 illustrates the basic procedural flow of such a method. Here, in a first analysis stage 21, the image is analyzed in order to generate filter coefficients associated with the individual pixels of the image. In parallel therewith, in a detection stage 22, which may possess various substages, blocking artifacts are detected and those image regions in which ringing artifacts may potentially be present are detected. A selection stage 221 chooses image regions, for example image regions having 7 rows and 20 columns, to which the individual detection algorithms are applied. A blocking stage 222 detects the regions in which blocking artifacts are present. Optionally, items of information from a block grid stage 224, which generate items of information about a block grid present in the image, are employed for this purpose. A ringing stage 223 determines the regions in which ringing artifacts may potentially occur.

Detection results of the blocking stage 222 are supplied to a first modification unit 23, which modifies filter coefficients of those image regions in which blocking artifacts were detected and leaves unchanged the filter coefficients of those image regions in which no artifacts were detected. The filter coefficients available at the output of the first modification unit, which may already have been modified, are supplied to a second modification unit 24, which further modifies the filter coefficients using the detection results of ringing stage 223.

The filter coefficients, modified as applicable, available at the output of second modification unit 24 are supplied to a synthesis stage 25, which reconstructs the video information values from these filter coefficients. One of the two detection stages and thus one of the two modification stages may be dispensed within a simplified method.

Although the present invention has been illustrated and described with respect to several preferred embodiments thereof, various changes, omissions and additions to the form and detail thereof, may be made therein, without departing from the spirit and scope of the invention.

What is claimed is:

1. A method for reducing image artifacts in an image that includes a number of pixels each of which includes at least one video information value, the method comprising:
generating a plurality of filter coefficients for at least some of the pixels of the image, on the basis of which the video information values of the pixels can be reconstructed;
performing artifact detection to detect artifact regions within the image;
modifying at least some filter coefficients of those pixels that lie within the artifact regions to generate modified filter coefficients; and
synthesizing the video information values using the filter coefficients, the modified filter coefficients being employed for the synthesis for pixels lying within the artifact regions.

2. The method of claim 1, further comprising:
determining a first pixel difference value that depends on the difference of the video information values of at least a first pixel pair exhibiting two pixels that are adjacent across a pixel boundary of the image;
determining at least a second pixel difference value that depends on the difference of the video information values of at least a second pixel pair exhibiting two pixels that are disposed a distance, in a first direction perpendicular to the pixel boundary, from the pixels of the first pixel pair; and
comparing the first pixel difference value with the second pixel difference value, the presence of a blocking artifact along the pixel boundary being posited if the ratio between the first and second pixel difference values is greater than a specified first threshold value or if a difference between the first and second pixel difference values is larger than a specified second threshold value.

3. The method of claim 2, further comprising:
determining at least a third pixel difference value that depends on the difference of the video information values of at least a third pixel pair exhibiting two pixels that are disposed, in a second direction lying opposite the first direction, a distance from the pixels of the first pixel pair perpendicularly to the pixel boundary; and
comparing the first pixel difference value with the second and third pixel difference values, the presence of a blocking artifact along the pixel boundary being posited if the ratio between the first and second pixel difference values and the ratio between the first and third pixel difference values is larger than the specified first threshold value or if the difference between the first and second pixel difference values and the difference between the first and third pixel difference values is larger than the specified second threshold value.

4. The method of claim 2, wherein the pixel difference value depends on the absolute value or a whole-number power of the difference of the video information values of the relevant pixel pair.

5. The method of claim 2, wherein the first pixel difference values each depend on the difference of the video information values of a plurality of first pixel pairs disposed along the same pixel boundary.

6. The method of claim 2, wherein the image exhibits a plurality of image blocks adjoining one another and wherein the presence of a blocking artifact along a pixel boundary is posited only when the pixel boundary or runs along a block boundary.

7. The method of claim 6, wherein the determination of a run of block boundaries comprises:
   determining column and row difference values relative to adjacent columns and rows, which depend on differences of the video information values of the pixels of at least some pixel pairs disposed adjacent one another in adjacent columns or rows.

8. The method of claim 2,
   wherein a local blocking measure is determined for an image region and a global blocking measure is determined for a larger image region comprehending the image region or for the entire image;
   wherein a reduction factor is determined on the basis of the global blocking measure and a local reduction factor is determined on the basis of the local blocking measure; and
   wherein reduction of filter coefficients for pixels contained in the image region depends on the global reduction factor and the local reduction factor.

9. The method of claim 2, comprising the following for the detection of artifact regions having ringing artifacts:
   selecting an image region having a first number of rows and a first number of columns;
   determining column difference values and/or row difference values relative to adjacent columns and/or rows of the image region;
   comparing the individual column difference values and/or row difference values with specified third and fourth threshold values, the presence of a ringing artifact being posited when at least one of the column difference values or pixel difference values exceeds the third threshold value and when the number of column difference values and/or row difference values that exceed the fourth threshold value is not greater than a specified limiting value.

10. The method of claim 9, wherein the third and fourth threshold values are equal.

11. The method of claim 9, wherein the image region exhibits a pixel disposed centrally in the image region and wherein the filter coefficients of this pixel are modified upon the detection of a ringing artifact.

12. The method of claim 9, wherein the modification of the filter coefficients depends on the column difference values or the row difference values.

13. The method of claim 12, wherein the modification of the filter coefficients comprises:
   setting equal to zero those filter coefficients smaller than a specified first limiting value;
   damping those filter coefficients that are larger than the first limiting value and smaller than a second limiting value;
   leaving unchanged those filter coefficients that are larger than the second limiting value.

14. The method of claim 13, wherein the second limiting value is twice as large as the first limiting value.

15. The method of claim 13, wherein the first and second limiting values depend on the column differences or the row differences.

16. The method of claim 15, wherein the first and second limiting values increase as the column differences or the row differences increase.

17. The method of claim 2, wherein a modification of a filter coefficient of one type for a pixel comprises low-pass filtering using filter coefficients of the same type for adjacent pixels.

* * * * *